(12) United States Patent
Bickel

(10) Patent No.: US 8,024,390 B2
(45) Date of Patent: Sep. 20, 2011

(54) AUTOMATED DATA ALIGNMENT BASED UPON INDIRECT DEVICE RELATIONSHIPS

(75) Inventor: Jon A. Bickel, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 993 days.

(21) Appl. No.: 11/981,428

(22) Filed: Oct. 31, 2007

(65) Prior Publication Data

US 2008/0065712 A1    Mar. 13, 2008

(51) Int. Cl.
*G06F 17/15* (2006.01)
(52) U.S. Cl. ........................................ 708/422
(58) Field of Classification Search .................. 708/422
See application file for complete search history.

(56) References Cited

U.S. PATENT DOCUMENTS

| | | | | |
|---|---|---|---|---|
| 4,817,014 | A * | 3/1989 | Schneider et al. | 708/422 |
| 4,855,671 | A | 8/1989 | Fernandes | 324/127 |
| 5,353,404 | A * | 10/1994 | Abe et al. | 345/547 |
| 6,088,659 | A | 7/2000 | Kelley et al. | 702/62 |
| 6,094,650 | A | 7/2000 | Stoffel et al. | 707/3 |
| 2003/0014678 | A1 | 1/2003 | Ozcetin et al. | 713/400 |
| 2003/0222509 | A1 | 12/2003 | Andarawis et al. | 307/139 |
| 2004/0225649 | A1 | 11/2004 | Yeo et al. | 707/3 |
| 2005/0050095 | A1 | 3/2005 | Hurtis et al. | 707/104.1 |

FOREIGN PATENT DOCUMENTS

| | | |
|---|---|---|
| GB | 2 220 573 A | 1/1990 |
| WO | WO 00/065480 | 11/2000 |
| WO | WO 2005/059572 A1 | 6/2005 |

OTHER PUBLICATIONS

Written Opinion corresponding to International Patent Application No. PCITUS2006/025445, European Patent Office, dated Nov. 24, 2006, 7 pages.
International Search Report corresponding to International Patent Application No. PCT/US2006/025445, European Patent Office, dated Nov. 24, 2006, 3 pages.
Article: "*Cross Correlation—Auto Correlation—2D Pattern Identification*," by Paul Bourke, dated Aug., 1996, 11 pages.
Article: "*The Need for Speed*," by Richard P. Bingham, Dranetz-BMI, dated Nov., 1999, 12 pages.
Article: "*GPS World—Pacify, The Power GPS Harness For Large-Area Electrical Grid*," by Dennis Erickson and Carson Taylor, dated Apr. 1, 2005, 9 pages.
Article: "*Protection, Control, Reliability and Diagnostic Improvements Via Single-Processor Control Of Circuit Breakers In Low Voltage Switchgear*," IEEE, copyright 2005, 10 pages.

(Continued)

*Primary Examiner* — Tan V Mai

(57) ABSTRACT

A noisy data alignment algorithm for determining cycle count offsets for noisy pairs of n monitoring devices. A direct cycle count offset matrix is determined based upon the highest correlation coefficients produced by correlating frequency variation data from each device pair $D_{ij}$. For each direct cycle count offset $M_{ij}$, indirect cycle count offsets are calculated as a function of at least $M_k$, where $k \neq i \neq j$, to produce indirect cycle count offsets. The statistical mode of these indirect offsets is compared with the corresponding $M_{ij}$ in the matrix. When they differ, $M_{ij}$ in the direct matrix is adjusted to be equal to the statistical mode. All indirect cycle count offsets for all other unique device pairs, $M_{ij}$, are calculated to iterate to a single solution in which all indirect cycle count offsets are equal to the corresponding direct cycle count offset. An optional verification algorithm is also provided.

23 Claims, 15 Drawing Sheets

OTHER PUBLICATIONS

Article: *"Innovation To Reality—Introducing State-Of-The-Art Protection and Monitoring To Existing Low-Voltage Switchgear,"* IEEE, copyright 2005, 11 pages.

Article: *"Re: Thinking Switchgear—The Difference Entellisys™ Makes For You,"* date unknown, 16 pages.

Article: *"Automated Decision Tree Generation For Object Recognition And Classification,"* Ren C. Luo et al., Proceedings of the International Conference on Industrial Electronics, Control and Instrumentation (IECON). Industrial Applications of Mini, Micro and Personal Computers, Document No. XP-0020568809, dated Sep. 29, 1986, pp. 357-362.

* cited by examiner

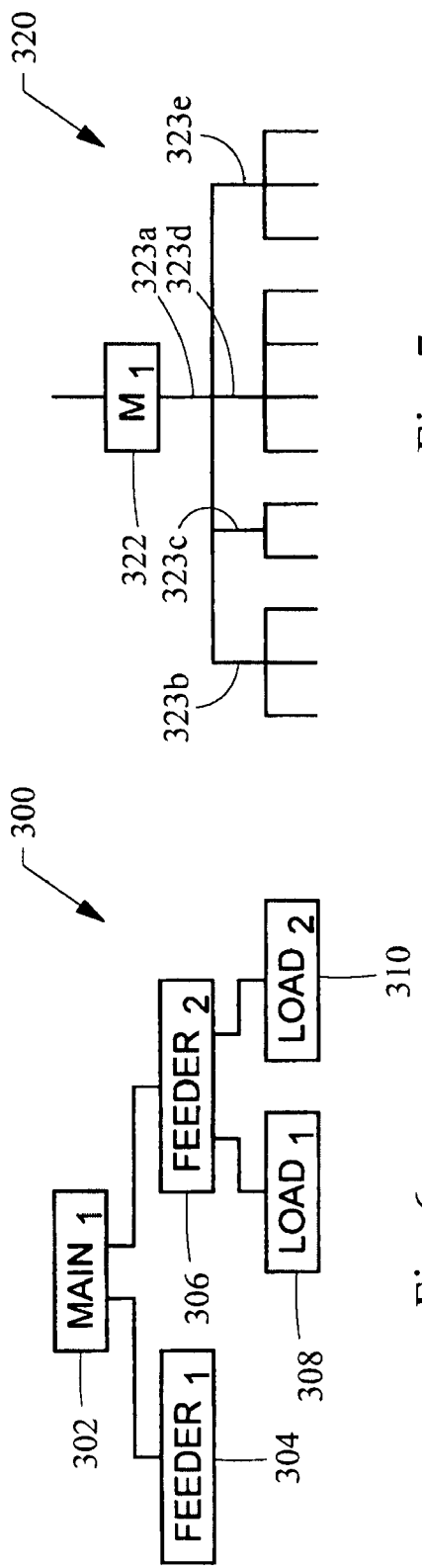
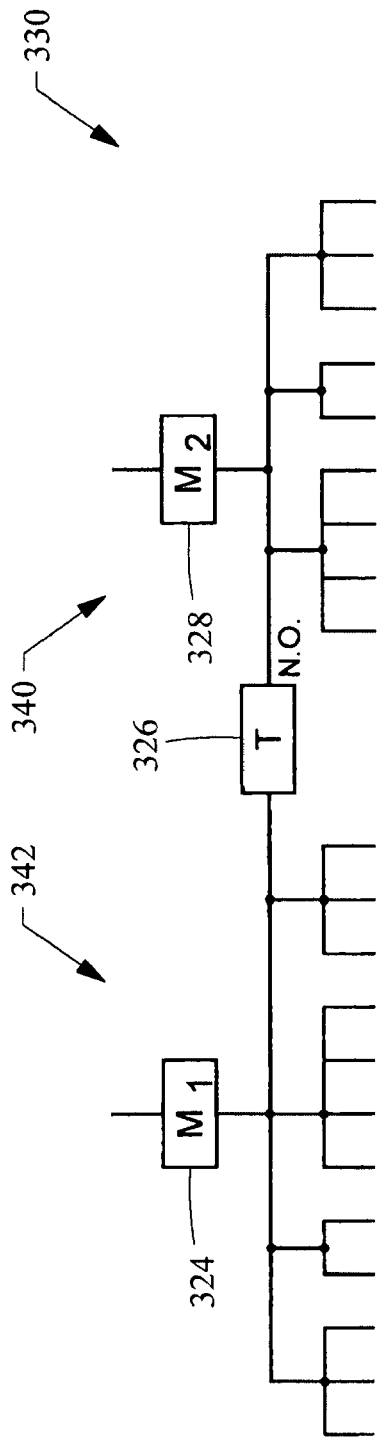
Fig. 6
Fig. 7
Fig. 8

AUTOMATED DATA ALIGNMENT BASED UPON INDIRECT DEVICE RELATIONSHIPS

RELATED APPLICATION

This application is related to co-pending U.S. application Ser. No. 11/174,099, entitled "Automated Precision Alignment of Data in a Utility Monitoring System," filed Jul. 1, 2005.

FIELD OF THE INVENTION

Aspects disclosed herein relate generally to utility monitoring systems, and, in particular, to automated precision alignment of data among monitoring devices.

BACKGROUND OF THE INVENTION

Since the introduction of electrical power distribution systems in the late $19^{th}$ century, there has been a need to monitor their operational and electrical characteristics. The ability to collect, analyze, and respond to information about the electrical power system can improve safety, minimize equipment loss, decrease scrap, and ultimately save time and money. To that end, monitoring devices were developed to measure and report such information. With the dawn of the electronics age, the quality and quantity of data from monitoring devices was vastly improved, and communications networks and software were developed to collect, display and store information. Unfortunately, those responsible for evaluating data from monitoring devices are now overwhelmed by information from their monitoring systems. In the endeavor to maximize the usefulness of a monitoring system, monitoring equipment manufacturers are seeking methods of presenting information in the most useful format.

Effectively monitoring today's electrical power distribution systems is cumbersome, expensive, and inefficient. Electric power monitoring systems are typically arranged in a hierarchy with monitoring devices such as electrical meters installed at various levels of the hierarchy (refer to FIG. 2). Monitoring devices measure various characteristics of the electrical signal (e.g., voltage, current, waveform distortion, power, etc.) passing through the conductors, and the data from each monitoring device is analyzed by the user to evaluate potential performance or quality-related issues. However, the components of today's electrical monitoring systems (monitoring devices, software, etc.) act independently of each other, requiring the user to be an expert at configuring hardware, collecting and analyzing data, and determining what data is vital or useful. There are two problems here: the amount of data to be analyzed and the context of the data. These are separate but related issues. It is possible to automate the analysis of the data to address the amount of data. But, in order to do this reliably, the data must be put into context. The independence of data between each monitoring device evaluating the electrical system essentially renders each monitoring device oblivious of data from other monitoring devices connected to the system being analyzed. Accordingly, the data transmitted to the system computer from each monitoring device is often misaligned in that data from each monitoring device on the system does not arrive at the monitoring system's computer simultaneously. There are two basic reasons for the temporal misalignment of data between monitoring devices: communications time delays and monitoring device timekeeping & event time stamping. It is then up to the user to analyze and interpret this independent data in order to optimize performance or evaluate potential quality-related concerns on the electrical system.

Sophisticated processing capabilities in digital monitoring devices allow large amounts of complex electrical data to be derived and accumulated from a seemingly simple electrical signal. Because of the data's complexity, quantity, and relative disjointed relationship from one monitoring device to the next, manual analysis of all the data is an enormous effort that often requires experts to be hired to complete the task. This process is tedious, complex, prone to error and oversight, and time-consuming. A partial solution has been to use global positioning satellite (GPS) systems to timestamp an event, but this approach requires that the user purchase and install additional hardware and data lines to link the monitoring devices together. And this solution still requires the evaluation of large amounts of data because the system is only temporally in context; not spatially in context. Synchronizing data using GPS systems is also disadvantageous because of time delays associated with other hardware in the system. Loss of the signal from the GPS satellites renders this approach nonfunctional. Furthermore, any alignment of data by a GPS-based system can only be as accurate as the propagation delay of the GPS signal, which means that the data still may not be optimally aligned when a GPS system is used.

The addition of supplemental monitoring devices in the electrical system does nothing more than generate more information about the electrical system at the point where the meter is added in the electrical system, increasing complexity without any benefit. Any usefulness of the data is generally limited to the locality of the monitoring device that was added, while even more data is amassed.

The complexity of many electrical systems usually necessitates an involved configuration process of monitoring systems because each metered point in the electrical system has different characteristics, which is why multiple monitoring devices are installed in the first place. As a result of the enormous volume of complex data accumulated from electrical monitoring systems heretofore, a thorough analysis of the data is typically not feasible due to limited resources, time, and/or experience.

Temporal alignment of the data is one important aspect to understand and characterize the power system. Another important aspect is having a thorough knowledge of the power monitoring system's layout (or hierarchy). Power monitoring devices measure the electrical system's operating parameters, but do not provide information about how the parameters at different points on the power monitoring system relate to each other. Knowing the hierarchy of the power monitoring system puts the operating parameters of multiple monitoring devices into context with each other.

To determine the layout of a power monitoring system, a user must review electrical one-line drawings or physically perform an inventory of the electrical system if one-line drawings are unavailable. The user manually enters the spatial information into the monitoring system software for analysis. When a new device or monitored load is added or moved within the power monitoring system, the user must manually update the monitoring system software to reflect the new addition or change.

Data alignment and layout information are essential to understanding and characterizing the power system. With these two pieces of information, the data from each meter can be integrated and put into context with every other meter in the power system. Heretofore, the only techniques for passably integrating data were complex, expensive, manually intensive, and time-consuming for the user. These techniques also permit only limited integration of data and require additional hardware (such as GPS hardware), data lines, and supplemental monitoring device accessories.

What is needed, therefore, is an automated data integration technique, including automatic precision alignment of data and automatic hierarchical classification of system layout. The present invention is directed to satisfying this and other needs.

SUMMARY OF THE INVENTION

Briefly, according to an embodiment of the present invention, a method of aligning data measured by monitoring devices coupled to a power monitoring system includes receiving reference signal data from a reference monitoring device. The reference signal data represents frequency variations measured by the reference monitoring device for a predetermined number of cycles. The method further includes receiving second signal data from a second monitoring device that measures frequency variations for a predetermined number of cycles. The method further includes automatically aligning the reference signal data with the second signal data.

According to another embodiment of the present invention, the automatically aligning includes computing a correlation coefficient produced by a cross-correlation algorithm using the reference signal data and the second signal data. The automatically aligning further includes determining whether a maximum correlation coefficient is produced by shifting the second signal data relative to the reference signal data and computing a correlation coefficient produced by the cross-correlation algorithm using the shifted second signal data and the reference signal data. The automatically aligning further includes repeating the determining until a maximum correlation coefficient is produced by the cross-correlation algorithm. The cross-correlation algorithm can be a circular or linear cross-correlation algorithm in embodiments of the present invention.

According to various embodiments of the present invention, the method may further include communicating an instruction to the reference monitoring device to buffer the reference signal data for the predetermined number of cycles. The method may further include providing reference time data, receiving first time data from the reference monitoring device, and synchronizing the first time data with the reference time data. The method may further include sampling data at the zero-crossing of a reference channel associated with the reference monitoring device, determining whether the values of the sampled data are zero, negative, or positive, assigning phase notations based on the determining, and displaying information representing the phase notations to the user. Optionally, the user can be alerted when the phase notations are misidentified on a phase conductor.

According to still another embodiment of the present invention, monitoring system software sends an instruction or message to monitoring devices in a power monitoring system to begin buffering data (preferably data indicative of fundamental frequency variations). The monitoring system software reads the data from each monitoring device and selects a reference monitoring device and another monitoring device to analyze. The data between the two monitoring devices are cross-correlated using a circular or linear cross-correlation algorithm, for example. The cycle count and time relationships between the two devices are stored in a matrix. When all devices have been analyzed and their respective data aligned relative to one another, the monitoring system software analyzes the voltage (or current) data for mis-wirings. If a mis-wiring is detected, the user is notified.

According to other aspects, noisy data alignment techniques are disclosed. A method of automatically aligning data measured by a number, n, of monitoring devices in a power monitoring system, comprises: receiving from each of said monitoring devices respective signal data representing at least frequency variations measured by respective ones of said monitoring devices, said monitoring devices including a reference monitoring device and a second monitoring device; correlating said signal data from said reference monitoring device with said signal data from said second monitoring device to determine a reference cycle count, $M_i$, associated with said reference monitoring device corresponding to a maximum correlation coefficient and a second cycle count, $M_j$, associated with said second monitoring device corresponding to said maximum correlation coefficient; automatically calculating a direct cycle count offset, $M_{ij}$, as a function of a difference between said reference cycle count, $M_i$, and said second cycle count, $M_j$, and storing said direct cycle count offset in a direct cycle count offset matrix; and automatically calculating an indirect cycle count offset as a function of at least $M_k$, where $k \neq i \neq j$ and $1 \leq k \leq n$, said $M_k$ being a cycle count associated with a monitoring device of said n monitoring devices other than said reference monitoring device and other than said second monitoring device.

The automatically calculating said indirect cycle count offset may be carried out with respect to at least two other of said n monitoring devices except said reference monitoring device and except said second monitoring device to produce at least two indirect cycle count offsets including said indirect cycle count offset. The method may further comprise determining which of said at least 2 indirect cycle count offsets differs from said direct cycle count offset. The method may still further comprise: determining a statistical mode from a set comprised of said at least 2 indirect cycle count offsets to produce a mode value; and determining whether the mode value differs from said direct cycle count offset.

The method may further comprise, responsive to said direct cycle count offset differing from said indirect cycle count offset, producing a modified direct cycle count offset equal to said indirect cycle count offset. The method may further comprise storing an indication that said signal data associated with said reference monitoring device and said signal data associated with said second monitoring device are aligned. The method may further comprise communicating said modified direct cycle count offset to said reference monitoring device or to said second monitoring device to cause said reference monitoring device or said second monitoring device to adjust a cycle counter in said reference monitoring device or in said second monitoring device by a value corresponding to said modified direct cycle count offset.

The indirect indirect cycle count offset may be a function of at least $M_{ik}-M_{jk}$. The indirect cycle count offset may be a function of at least $M_m$, where $m \neq i \neq j$ and $1 \leq m \leq n$, said $M_m$ being a cycle count associated with a monitoring device of said n monitoring devices other than said reference monitoring device and other than said second monitoring device and other than said monitoring device associated with $M_k$.

The method may further comprise: determining a first verification cycle count, $M_i'$, associated with said reference monitoring device corresponding to a first correlation coefficient that is less than said maximum correlation coefficient; determining a second verification cycle count, $M_j'$, associated with said second monitoring device corresponding to said first correlation coefficient; automatically calculating a verification cycle count offset, $M_{ij}'$, based upon the difference between said first verification cycle count, $M_i'$, and said second verification cycle count, $M_j'$, and storing said verification cycle count offset; and responsive to said verification cycle count offset equaling said indirect cycle count offset, storing an indication of a level of confidence in said indirect cycle count offset based upon said first correlation coefficient.

The first correlation coefficient may be above a predetermined threshold below said maximum correlation coefficient. The direct cycle count offset matrix may be an (n×n) skew-symmetric matrix. The frequency variations represented by said first signal data may be variations in fundamental frequency or variations in harmonic frequency, wherein said variations are associated with a voltage or a current.

Each of the n monitoring devices may include a cycle counter, and the method may further comprise communicating simultaneously a signal to said n monitoring devices to reset their respective cycle counters.

According to another aspect, a method of automatically aligning data measured by a number, n, of monitoring devices in a power monitoring system, comprises: receiving from each of said monitoring devices respective signal data, $S_n$, representing at least frequency variations measured by respective ones of said monitoring devices; for each of a plurality of device pairs within a set comprising said n number of monitoring devices, wherein each device pair is termed $D_{ij}$, where i≠j, where 1≦i≦n, and where 1≦j≦n, correlating said signal data $S_i$ with said signal data $S_j$ for each of said device pairs, $D_{ij}$, to determine respective cycle counts, $M_i$ and $M_j$, associated with $D_i$ and $D_j$, respectively, said cycle counts corresponding to a maximum correlation coefficient produced by said correlating; for each of said device pairs, $D_{ij}$, automatically calculating a direct cycle count offset, $M_{ij}=M_i-M_j$, and storing said direct cycle count offset in a direct cycle count offset matrix; for each of said direct cycle count offsets, $M_{ij}$, automatically calculating a plurality of indirect cycle count offsets as a function of at least $M_k$, said $M_k$ being a cycle count associated with a monitoring device of said n monitoring devices other than said reference monitoring device and other than said second monitoring device, where 1≦k≦n, and k≠i≠j; storing said plurality of indirect cycle count offsets for each $M_{ij}$ in an indirect cycle count offset matrix; and for each of said direct cycle count offsets, $M_{ij}$, in said direct cycle count offset matrix, determining whether $M_{ij}$ is not equal to at least one of said plurality of indirect cycle count offsets, and, responsive thereto, storing an indication that $M_{ij}$ in said direct cycle count offset matrix is equal to a value corresponding to said at least one of said indirect cycle count offsets.

The method may further comprise communicating an indication of said value to $D_i$ or $D_j$ to cause $D_i$ or $D_j$ to adjust a cycle counter by an amount corresponding to said value. The method may further comprise communicating a signal to each of said n monitoring devices to reset respective cycle counters in each of said n monitoring devices at substantially the same time. The method may further comprise: determining a statistical mode from a set comprised of said indirect cycle count offsets for $M_{ij}$ to produce a mode value; and determining whether said mode value equals $M_{ij}$ in said direct cycle count offset matrix.

The correlating may produce a plurality of correlation coefficients including said maximum correlation coefficient, and the method may further comprise: for said devices $D_i$ and $D_j$ corresponding to said modified $M_{ij}$, determining a plurality of probable cycle count offsets associated with a predetermined number of said plurality of correlation coefficients that are less than said maximum correlation coefficient; and responsive to one of said plurality of said probable cycle count offsets equaling said modified $M_{ij}$, storing an indication of a level of confidence in said modified $M_{ij}$ commensurate with how proximal a correlation coefficient of said plurality of said correlation coefficients corresponding to said one of said plurality of said probable cycle count offsets is to said maximum correlation coefficient.

The method may further comprise: receiving from at least one of said monitoring devices second signal data representing at least frequency variations measured by said at least one of said monitoring devices; and adjusting a cycle count associated with said at least one of said monitoring devices by said value corresponding to said at least one of said indirect cycle count offsets.

According to still another aspect, a method of automatically aligning data monitored by a number, n, of monitoring devices, D, associated with a power monitoring system, comprises: automatically correlating respective signal data from a pair of said monitoring devices, $D_i$ and $D_j$, to determine a maximum correlation coefficient associated with respective cycle counts for said pair of monitoring devices, $D_{ij}$, said respective signal data representing frequency variations monitored by said $D_i$ and said $D_j$, respectively; determining a first cycle count offset, $M_{ij}$, by calculating a difference between said respective cycle counts; determining a second cycle count offset from a function that includes at least a cycle count associated with a monitoring device of said monitoring devices other than $D_i$ or $D_j$; and storing an indication that said first cycle count offset is equal to a value corresponding to said second cycle count offset.

The method may further comprise communicating an instruction to said $D_i$ or to said $D_j$ to adjust a cycle counter, which stores said respective cycle counts, by an amount corresponding to said value.

The automatically correlating may include determining whether said second cycle count offset equals a cycle count offset associated with a correlation coefficient that is less than said maximum correlation coefficient.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 6 is a functional block diagram of a simplified hierarchy with a single main and two feeders;

FIG. 7 is an exemplary diagram of a single radial-fed system;

FIG. 8 is an exemplary diagram of a multiple radial-fed system;

FIGS. 9-11A is a flow chart diagram of an auto-learned hierarchy algorithm in accordance with an embodiment of the present invention;

Figure 1:
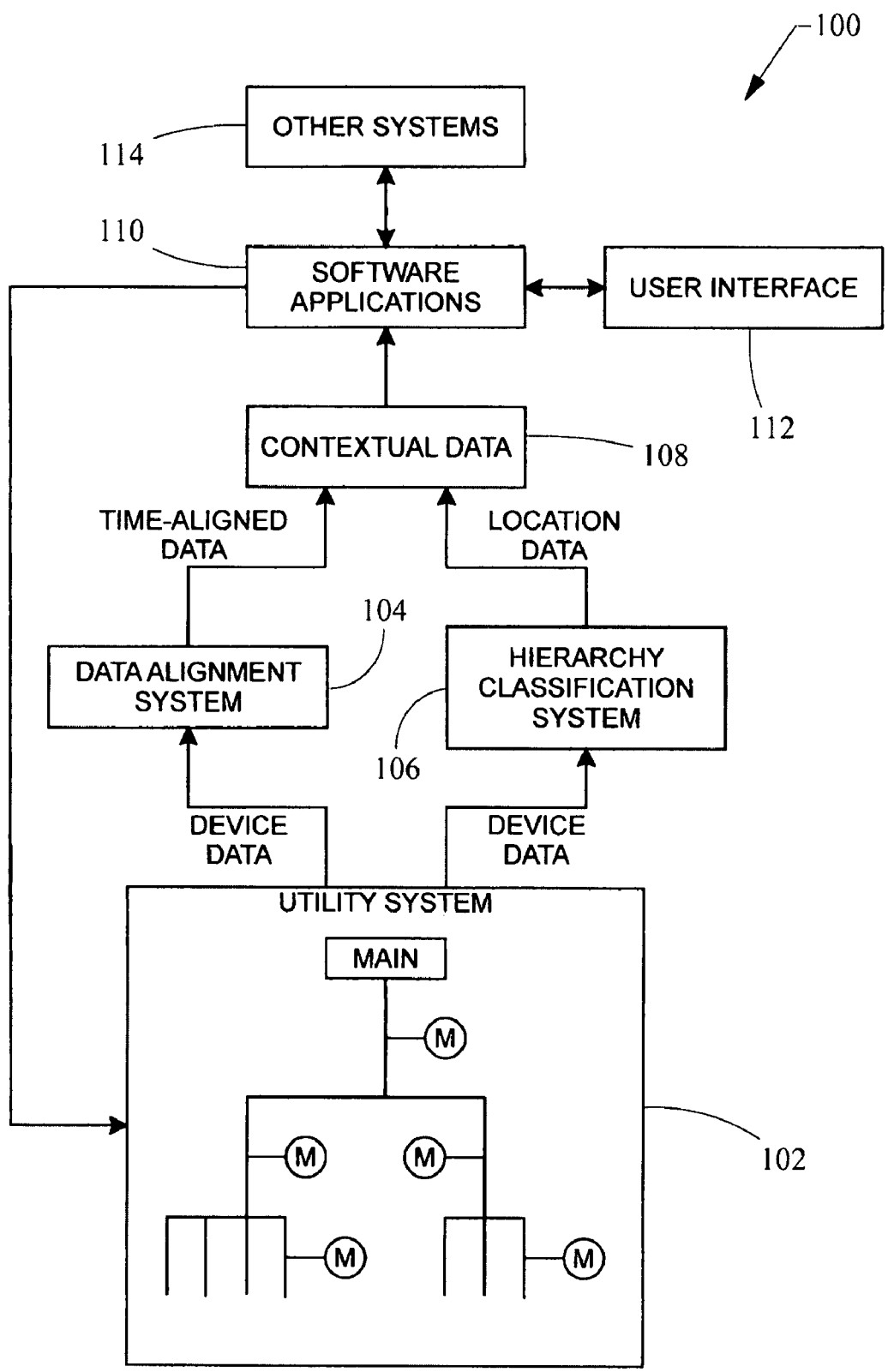
FIG. 1 is functional block diagram of an automated data integration monitoring system in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to FIG. 1, an automated data integrated monitoring system 100 is generally shown. A utility system 102 having multiple monitoring devices M provides data from each monitoring device M that is communicated to an automated data alignment system 104 and an automated hierarchy classification system 106. The data is aligned automatically in the automated data alignment system 104 in accordance with the present invention and produces data that is aligned such that it represents the data when it was actually seen simultaneously by the monitoring devices M in the power monitoring system 102. The hierarchy classification system 106 automatically learns the hierarchy of monitoring devices present in the utility system 102 and their relationships relative to one another.

Once the data from each monitoring device M is aligned and each monitoring device's location is known, the data is said to be in context 108. The contextual data 108 can be used by software applications 110 to provide and diagnose useful information about the utility system 102 beyond what is generally available if the data is not in context. The utility being monitored in the utility system 102 can be any of the five utilities designated by the acronym, WAGES, or water, air, gas, electricity, or steam. Each monitoring device measures characteristics of the utility, and quantifies these characteristics into data that can be analyzed by a computer.

A user interacts with the software applications 110 via a conventional user interface 112. The software applications 110 can be linked to other systems 114, such as a billing system, and use the contextual data 108 to communicate messages between the other systems 114 and the user interface 112.

The data alignment system 104 aligns data, such as voltage, current, time, events, and the like, from multiple monitoring devices M in a utility system, and is a valuable tool for users. When data from all the monitoring devices M is aligned to the same point in time that the data occurred, the data can be put into a temporal context from which additional decisions regarding hardware and software configuration can be automatically made or recommended. As used herein, a monitoring device refers to any system element or apparatus with the ability to sample, collect, or measure one or more operational characteristics or parameters of a utility system 102. When the utility system 102 is a power monitoring system, the monitoring device M can be a meter that measures electrical characteristics or parameters of the power monitoring system.

The data alignment techniques (which are detailed below) according to various aspects of the present invention accomplish at least the following:

1) Automated alignment of data in monitoring devices;

2) Automated synchronization of time in monitoring devices;

3) Alignment of data and time in monitoring devices located at different points on the power utility grid (where the monitoring system software may obtain time data from the Internet or another server); and 4) Diagnosing misidentification or mislabeling of phases throughout the electrical power system.

All real-world electrical signals in power systems experience subtle variations in their frequency and amplitude over time. This variation of the signal's frequency and amplitude are both indeterminate and unique with respect to time. Each monitoring device located on the same utility grid will simultaneously experience the same frequency variations. Analysis of data from monitoring devices that are directly linked to each other in the hierarchy will reveal a correlation in their amplitude variations. Analysis of both the frequency and amplitude variations of the signal are then used to precisely align the data of one monitoring device with respect to another device (or all the monitoring devices to each other) in the data alignment system 104. The details of the data alignment system 104 are discussed below.

The data alignment techniques of the present invention allow all monitoring devices M in a power utility system hierarchy to be aligned to the zero-crossing of all three phase voltages without the use of additional hardware. The present invention also anticipates potential phase shifts between various monitoring devices, for example, those caused by certain transformer configurations. Once the data of the monitoring devices are aligned with each other, the system data is essentially aligned with respect to the time it occurred, making more complex data analyses feasible.

Figure 2:
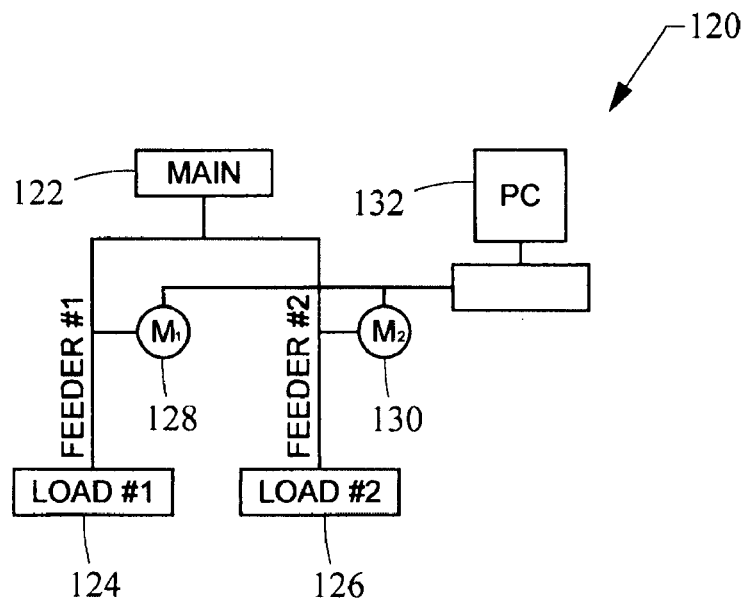
FIG. 2 is a functional block diagram of a simplified power monitoring system.

A simplified configuration of a power monitoring system 120 is shown in FIG. 2. The power monitoring system 120 includes a main 122 connected to a first load 124 by a first feeder and to a second load 126 by a second feeder. Monitoring devices 128, 130 measure electrical characteristics or parameters associated with the first and second feeders, respectively. Each monitoring device 128, 130 is communicatively coupled to a computer 132.

Figure 3:
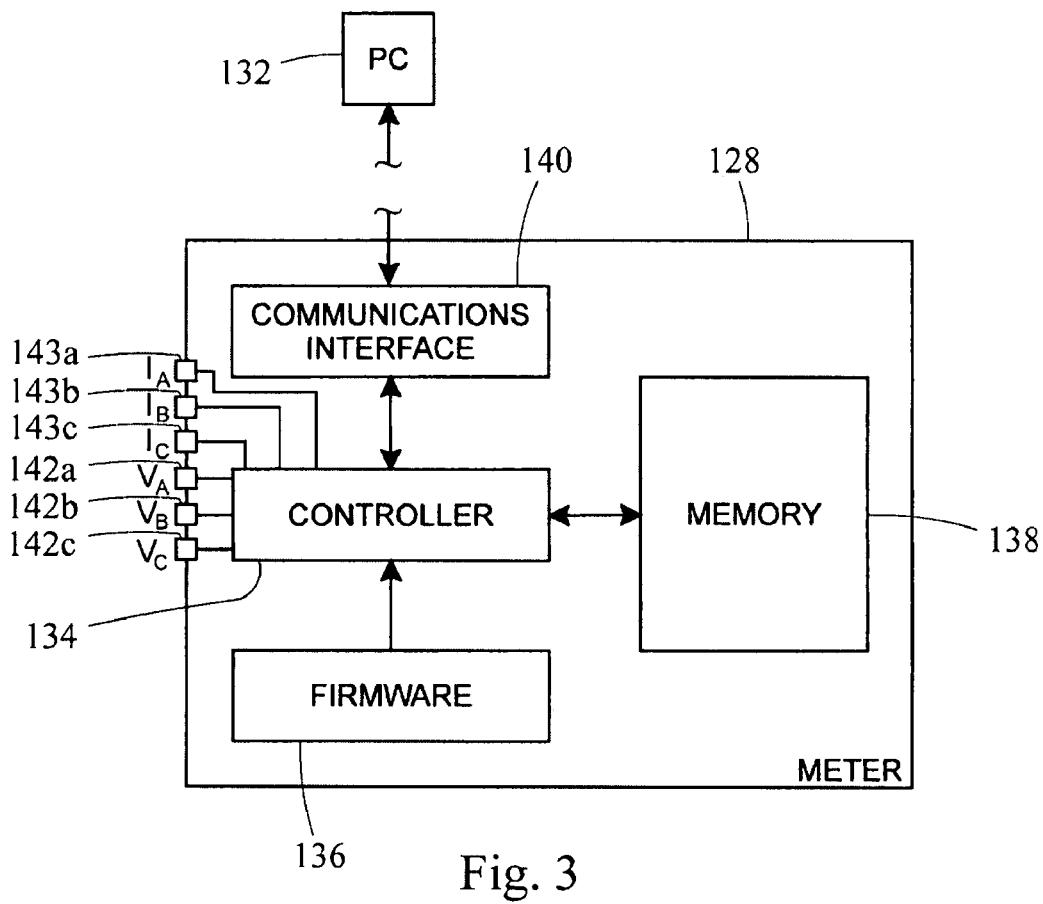
FIG. 3 is a functional block diagram of a monitoring device in accordance with an embodiment of the present invention.

The first monitoring device 128 can be a power meter (or electric meter), such as shown in FIG. 3. The monitoring device 128 includes a controller 134, firmware 136, memory 138, a communications interface 140, and three phase voltage conductor connectors 142a,b,c, which connect to the $V_A$, $V_B$, and $V_C$ phase voltage conductors, respectively, and are coupled to the controller 134. Three phase current conductor connectors 143a,b,c, which connect to the $I_A$, $I_B$, and $I_C$ phase current conductors, respectively, are optionally coupled to the controller 134. The firmware 136 includes machine instructions for directing the controller to carry out operations required for the monitoring device. Memory 138 is used by the controller 134 to store electrical parameter data measured by the monitoring device 128.

Instructions from the computer 132 are received by the monitoring device 128 via the communications interface 140. Those instructions include, according to an embodiment of the present invention, instructions that direct the controller 134 to mark the cycle count, to begin storing electrical parameter data, or to transmit to the monitoring system software 132 electrical parameter data stored in the memory 138. The electrical parameter data can include any data acquired by monitoring devices, including any combination of frequency variations, amplitude variations, and phase variations.

The present invention provides an algorithm that precisely, automatically, and temporally aligns the data from multiple monitoring devices to the same voltage zero-crossing. Other data alignment aspects discussed below are based on this capability. The data alignment aspect of the present invention is facilitated by functionality in both the monitoring device 128 and the monitoring system software running on the computer 132, and the requirements of each will be discussed individually. Collection and partial analysis of data is performed in the monitoring device 128.

From the time the monitoring device 128 is energized, a cycle count is performed of the measured voltage signals. The cycle count is sequentially iterated with each positive voltage zero-crossing (or, alternately, with each negative voltage zero-crossing). As the monitoring device 128 measures both the frequency and amplitude variations of the voltage and current from cycle to cycle, a comparison is performed to their respective nominal values. The frequency and amplitude variations and associated cycle count are tracked by the device firmware 136. The associated monitoring device time at any specified cycle count can be stored in the memory 138.

The monitoring system software executed by the computer 132 initiates alignment of the data associated with multiple monitoring devices by sending a global command to all monitoring devices 128, 130 on the power monitoring system 120 to mark their cycle count, time and buffer a predetermined amount of cycle-by-cycle data.

This predetermined amount of data is established based on the number of monitoring devices in the power monitoring system, the communications time delays in the power monitoring system and the magnitude of frequency and amplitude variations. When the buffering is complete, the monitoring devices 128, 130 transmit their buffered data to the computer 132.

Figure 4:
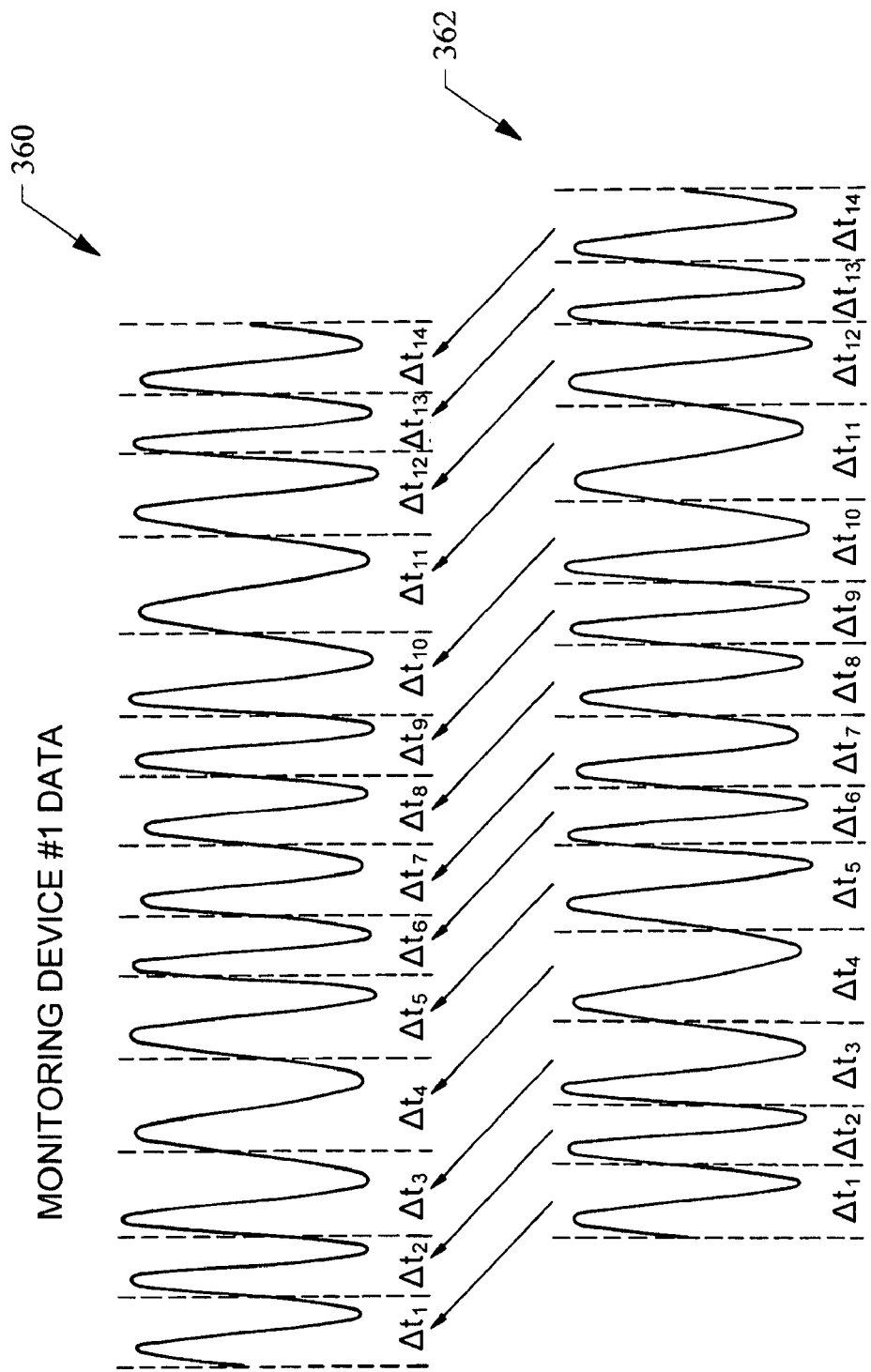
FIG. 4 are exemplary frequency data samples from two monitoring devices that are aligned in accordance with the present invention.

Once the data is collected by the monitoring devices 128, 130, the monitoring system software uploads the buffered data for analysis. There will likely be a time offset in each monitoring device's buffered data because the monitoring devices on the system will likely not begin buffering the data simultaneously due to communications time delays in the power monitoring system and internal time delays within the monitoring devices. The buffered data is analyzed by the monitoring system software on the computer 132 to locate the highest correlation in frequency between all the monitoring devices 128, 130. Generally, the highest correlation is located by sliding the buffered frequency data in one monitoring device with respect to another until the frequency variations line up with each other as shown in FIG. 4.

The frequency data 360 for the monitoring device 128 is "slid" relative to the frequency data 362 for the monitoring device 130 until the frequency data for each device line up. Thus, the zero-crossing associated with $\Delta t_1$ of monitoring device 128 is aligned with the zero-crossing associated with $\Delta t_1$ of monitoring device 130, the zero-crossing associated with $\Delta t_2$ of monitoring device 128 is aligned with the zero-crossing associated with $\Delta t_2$ of monitoring device 130, and so on. Cross-correlation algorithms for "sliding" two data sets relative to one another until they are aligned are discussed in further detail below in connection with FIGS. 5A and 5B.

Once the buffered data is aligned, the cycle count of the first monitoring device 128 is associated with the cycle count of the second monitoring device 130 in the software on the computer 132. The on-board monitoring device time may optionally also be aligned or associated relative to one another. This process is repeated for each monitoring device in the power monitoring system 120 until all devices' cycle counts are associated with each other. During the data alignment process, the monitoring system software on the computer 132 builds a matrix of each device's cycle count and time with respect to each other and the time on the computer 132.

Although FIG. 2 shows a simplified power monitoring system 120 with just two monitoring devices 128, 130, the data alignment embodiments of the present invention can be applied to any power monitoring system 120 of any complexity with multiple hierarchical levels, such as the one-line diagram shown in FIG. 7. For ease of illustration and discussion, only two monitoring devices 128, 130 have been discussed.

Once the data of the two monitoring devices 128, 130 is aligned relative to one another, there is typically no need to realign the data again unless a monitoring device loses its voltage signal or resets itself. In those cases, only the monitoring devices that lose their voltage signal or reset need to be realigned in accordance with the present invention. The data alignment technique of the present invention can be initiated by an event, such as an undervoltage or overvoltage condition, connecting or disconnecting a load to the power monitoring system, a change in the characteristics of the voltage, current, or a load, a monitoring device reset, or a power loss. The data alignment technique of the present invention can also be initiated automatically by the monitoring software or manually by the user.

Figure 5A:
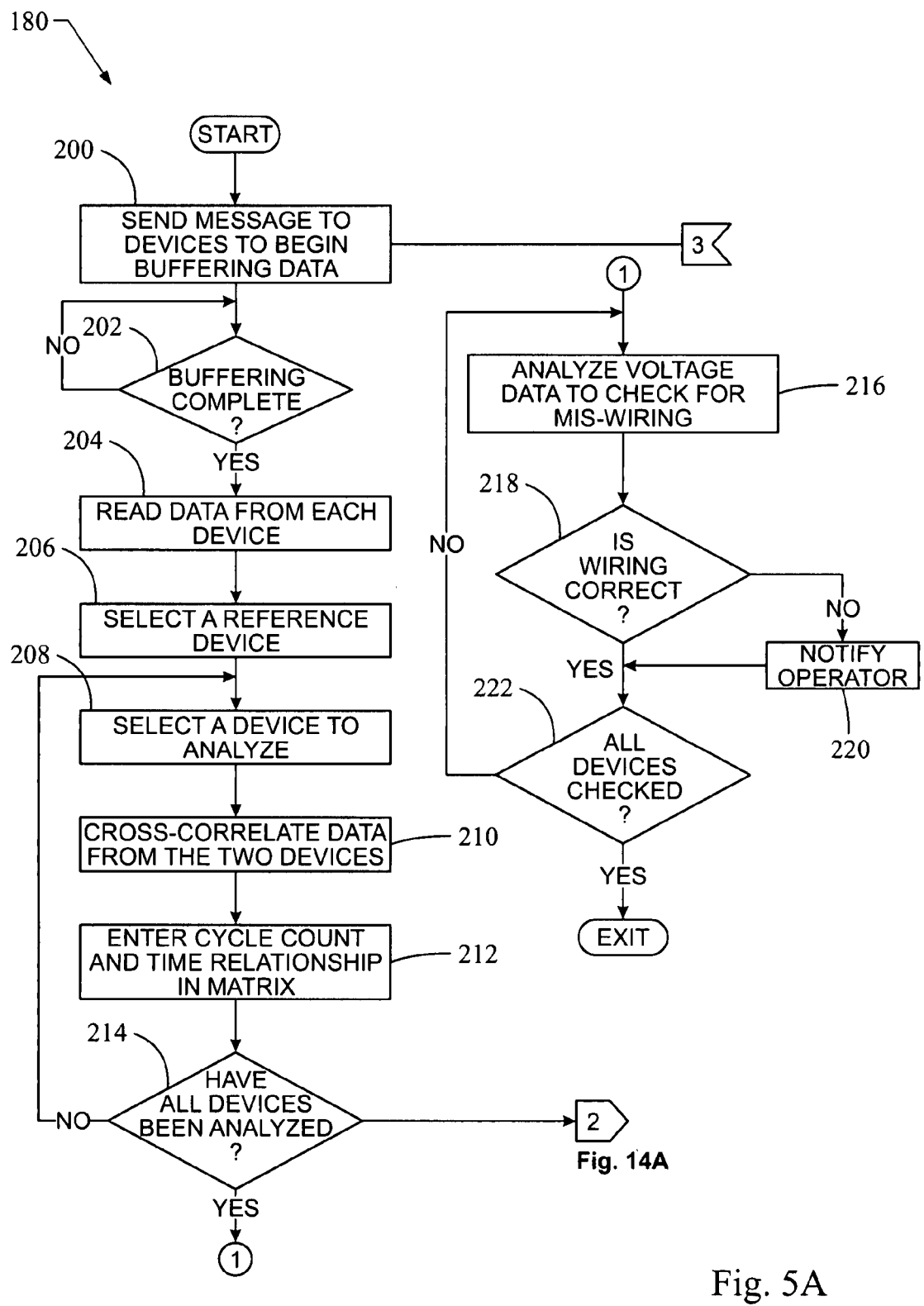
FIG. 5A is a flow chart diagram of a data alignment algorithm in accordance with an embodiment of the present invention.

Turning now to FIG. 5A, a flow chart, which can be implemented as a data alignment algorithm 180 executed by the computer 132, is shown for carrying out an embodiment of the present invention. The data alignment algorithm 180 begins by sending a message to the monitoring devices (such as monitoring devices 128, 130) to begin buffering data (200) until buffering is complete (202). The computer 132 reads the data from each device (204). The data represents, in an embodiment, electrical parameter data such as variations in (fundamental) frequency, variations in amplitude, and variations in phase. Preferably, the data represents variations in fundamental frequency. Fundamental frequency is a preferred criterion because it remains unchanged throughout the power monitoring system, even if transformers are present in the system. Amplitude and phases can shift when transformers are present in the system; however, the present invention contemplates using amplitude and phase information as criteria.

The computer 132 selects a reference monitoring device (206) such as monitoring device 128 and then selects a monitoring device to analyze (208) such as monitoring device 130. Data from the monitoring devices 128, 130 is then cross-correlated according to the present invention (210), and each device's cycle count and time relationships are entered into a matrix (212). The cross-correlation is carried out by a con ventional cross-correlation algorithm, preferably such as the one provided below in Equation 1.

$$r(d) = \frac{\sum_i [(x(i) - mx) * (y(i - d) - my)]}{\sqrt{\sum_i (x(i) - mx)^2} \sqrt{\sum_i (y(i - d) - my)^2}}$$ (Equation 1)

The correlation coefficient is represented by r(d), the delay (offset or shift) being represented by d, where $-1<=r(d)<=1$ for two series x(i) and y(i) representing the respective data from the monitoring devices 128, 130; and mx and my are the means of the corresponding series x(i) and y(i). According to an embodiment, the correlation algorithm is a circular correlation algorithm in which out-of-range indexes are "wrapped" back within range. In another embodiment, the correlation algorithm is a linear correlation algorithm in which each series is repeated. In still other embodiments, the correlation algorithm is a pattern-matching algorithm or a text-search algorithm.

After cross-correlation, the computer 132 checks whether all monitoring devices have been analyzed (214), and if so, proceeds to check the wiring of the phase conductors. In many instances, phase conductors may be misidentified throughout an electrical system by the contractor who installed them. For example, the phase that is identified as "A-phase" at the main switchgear may be identified as "B-phase" at the load. This nomenclature misidentification of the phase conductors can result in confusion, and even pose a safety hazard.

To mitigate this hazard, the computer 132 analyzes the voltage (or current) data by sampling data at the voltage (or current) zero-crossing of a reference channel on each monitoring device (216). The computer 132 determines whether the wiring is correct (218) by determining whether the values of the sampled data are zero, negative, or positive, and, based on those values, assigning phase notations (such as A, B, or C) for each reference channel. If all monitoring devices are identified accurately, the data values for Phase-A should be approximately zero. If the data values are negative, then the phase in question is the "B-Phase" for an ABC phase rotation. If the data values are positive, then the phase in question is the "C-phase" for an ABC phase rotation. The user is notified (220) whether the wiring is correct. Once the proper phase notation is determined for each monitoring device (222), the computer 132 may then allow the user to correct the misidentified phase notation in any or all monitoring devices. The phase diagnosis embodiments according to the present invention are applicable to voltage inputs as well as current inputs.

Figure 5B:
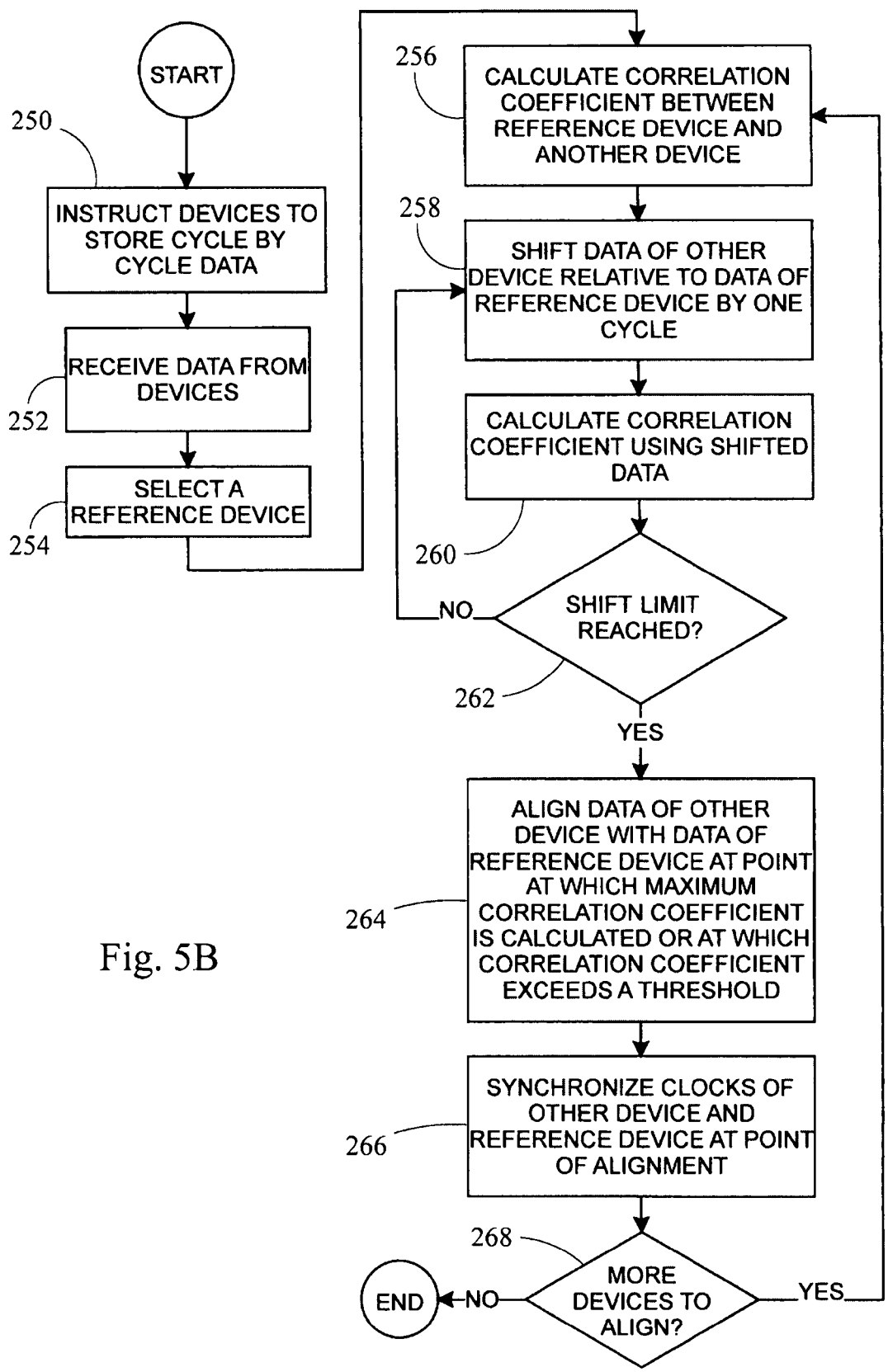
FIG. 5B is a flow chart diagram of a data alignment algorithm in accordance with another embodiment of the present invention.

FIG. 5B illustrates a flow chart for carrying out another embodiment of the present invention. As with FIG. 5A, reference will be made to the power monitoring system 120 shown in FIG. 2 for ease of discussion, but as mentioned before, the data alignment techniques of the present invention are applicable to any utility monitoring system.

The computer 132 instructs each monitoring device in the power monitoring system 120 to store data on a cycle-by-cycle basis (250) for a predetermined number of cycles, preferably between about 1,000 and about 10,000 cycles. When a sufficient amount of data has been stored by the monitoring devices, the computer 132 receives the data from the monitoring devices (252) and selects a reference monitoring device (254). Using a convention cross-correlation algorithm such as Equation 1 above, the computer 132 calculates a correlation coefficient r(d) between at least a portion of the data (such as about 400 cycles) of the reference monitoring device and the data of a second monitoring device (256). The calculated correlation coefficient is stored, and the data of the second monitoring device is shifted relative to the reference device by one cycle (258).

As mentioned above, the out-of-range indexes can be wrapped back within range according to a circular correlation algorithm or the indexes can be repeated according to a linear correlation algorithm. A correlation coefficient is calculated using the shifted data (260) and if no further shifts are required (262), the data of the second monitoring device is aligned with the data of the reference device at the point at which the maximum correlation coefficient is calculated or at which the correlation coefficient exceeds a threshold value, such as 0.5 (264). It should be noted that when the correlation coefficient r(d) is close to 1.0, the algorithm can exit without conducting any further shifts.

The computer 132 synchronizes the clocks of the second monitoring device and the reference device at the point of alignment (266). The computer 132 reads the cycle count in each monitoring device and the associated monitoring device's on-board clock time. A monitoring device's on-board clock time and cycle count may drift with respect to each other due to the limitations of the on-board clock. Once the data is aligned, the cycle count is considered the absolute reference for a monitoring device. Due to the clock drift, it may be necessary to re-read the time associated with a device's cycle count periodically to reestablish the device's time. The software on the computer 132 will then update the matrix containing the monitoring device time information.

Another capability of this feature is to allow all on-board monitoring device clocks to be periodically reset to the same value to provide a standard time for the entire power monitoring system. Preferably, the time within the monitoring system software (running on the computer 132) is set according to some absolute time reference. Once the computer time is set, the monitoring system software resets the time on all the monitoring devices accordingly. In this embodiment, the data and time of each monitoring device and the software would be more accurately aligned with the absolute time reference.

When there are no further monitoring devices to align (268), the procedure ends. In an alternate embodiment, all of the monitoring device's data is aligned before the clocks are synchronized (266).

Another advantage of the data alignment techniques of the present invention is the ability to align data and time on different points of the utility grid. If monitoring devices are located on two different points of the same utility grid, it is possible to align the monitoring devices together. In this embodiment, the monitoring devices at each geographic location are first aligned to each other in accordance with the present invention. The software managing all the systems is then used as the absolute time reference for all systems, giving them all a common point of reference.

Referring back to FIG. 1, the integrated monitoring system 100 includes the hierarchy classification system 106. Having a thorough knowledge of an electrical power system's layout is essential to understanding and characterizing the system. Power meters typically provide only the electrical system's operating parameters, but do not give information on how the parameters at different monitoring points on the electrical system relate to each other. Having the hierarchy of an electrical system puts the operating parameters of multiple monitoring devices into spatial context with each other. This spatial context gives the user a more powerful tool to troubleshoot system problems, improve system efficiencies, predict failures and degradation, locate the source of disturbances, or model system responses.

The hierarchy classification system 106 of the present invention allows the monitoring system software to collect data from the monitoring device on the utility system 102, and automatically determine the hierarchy of the utility system 102 with little or no user input. The level of detail given by the hierarchy classification system 106 directly correlates with the number and extent of monitoring devices in the utility system 102. As supplemental monitoring devices are added, the auto-learned hierarchical algorithm according to the present invention enables them to be automatically incorporated into the determined hierarchical structure.

A hierarchy of nodes is based on a relationship that determines that one node is always greater than another node, when the nodes are related. A hierarchy's relationship can link or interrelate elements in one of three ways: directly, indirectly, or not at all. An illustration of a direct link or interrelationship is shown in FIG. 6 between the Load$_2$ 310 and Feeder$_2$ 306. In contrast, an indirect link exists between Load$_2$ 310 and Main$_1$ 302. Finally, there is effectively no link between the Load$_1$ 308 and Load$_2$ 310 and between Feeder$_1$ 304 and Feeder$_2$ 306.

In the case of a power system hierarchy, an objective is to order elements in the power system so as to represent the true connection layout of the power system. Determining the hierarchy of a power system provides important information that can be used to solve problems, increase equipment and system performance, improve safety, and save money. The level of detail contained in a power system hierarchy will depend on both the number of elements or nodes that are being monitored and the node's ability to provide feedback to the auto-learned hierarchy algorithm in the monitoring system software running on the computer 132.

Generally, the hierarchy classification system 106 according to the present invention utilizes an auto-learned hierarchy algorithm in the monitoring system software that is based on rules and statistical methods. Periodically, the monitoring system software polls each monitoring device in the utility system 102 to determine certain characteristics or parameters of the utility system 102 at that node (represented by monitoring device M). Multiple samples of specified parameters are taken from each meter in the system at the same given point in time. Once the parameter data is collected from each node M in the utility system 102, the auto-learned hierarchy algorithm analyzes the data and traces the relationships or links among the monitoring devices with respect to the time the data sample was taken and the associated value of the data sample. This analysis may be performed periodically to increase the probability that the hierarchy is accurate, or to ascertain any changes in the hierarchy. Once this iterative process reaches some predetermined level of statistical confidence that the determined layout of the utility system 102 is correct, the auto-learned hierarchy algorithm ends. The final layout of the utility system 102 is then presented to the user for concurrence. As each monitoring device's data is evaluated over time (the learning period) with respect to all other monitoring devices using the auto-learned hierarchy algorithm, a basic layout of the hierarchical structure of the utility system 102 is determined based on the monitoring points available. In this respect, the algorithm according to the present invention uses historical trends of the data from each monitoring device, and those trends are compared to determine whether any interrelationship (link) exists between the monitoring devices. A more detailed hierarchical structure can be determined with more monitoring points available for analysis.

A benefit of the auto-learned hierarchy algorithm of the present invention is to provide automatically a basic hierarchical structure of a utility system being monitored with minimal or no input by the user. The hierarchy can then be used as a tool for evaluation by other systems 114. Another benefit is that the present invention improves the accuracy of the time synchronization between the monitoring devices and the monitoring system software.

In an embodiment in which the utility system 102 is a power monitoring system, samples of specific electrical parameters (such as power, voltage, current, or the like) are simultaneously taken from each monitoring device in the power monitoring system. This parameter data is stored and analyzed with respect to the time the sample is taken, the associated value of the data point, and the monitoring device providing the data.

Data taken from each monitoring device in the power monitoring system is compared with each other to determine whether any correlation exists between the monitoring devices. The data is analyzed for statistical trends and correlations as well as similarities and differences over a predetermined period of time in accordance with the present invention.

According to an embodiment, one or more rules or assumptions are used to determine the hierarchical order of the power system. Certain assumptions may have to be made about the utility system in order to auto-learn the utility system's hierarchy. The assumptions are based on Ohm's Law, conservation of energy, and working experience with typical power distribution and power monitoring systems.

General rules that may be made by the auto-learned hierarchy algorithm in connection with power systems and power monitoring systems may include or not include any combination of the following:

1. The power system being analyzed is in a single 320 (FIG. 7) or multiple radial feed configuration 330 (FIG. 8).
2. The meter measuring the highest energy usage is assumed to be at the top of the hierarchical structure (e.g., Main 322 shown in FIG. 7) taking into account inaccuracies in the meters.
3. The rate of sampling data by the meters is at least greater than the shortest duty cycle of any load.
4. Energy is not alternately consumed and generated on the power system during the parameter data collection process.
5. The error due to the offset of time in all meters on the power monitoring system is minimal where data is pushed from the monitoring device to the monitoring system software running on the computer 132.

Any combination of the following additional parameters may or may not be present for the auto-learned hierarchy algorithm:

1. Data is not collected for hierarchical purposes from two monitoring devices installed at the same point of a power system, though this parameter is not necessarily a requirement in all aspects disclosed herein.
2. Meters with no load are ignored or only use voltage, measurements, and/or configuration information to determine their position in the hierarchy.
3. Multiple mains (Main1, Main2, Main3, etc.) may exist in the power system.
4. Data is provided to the monitoring system software by each monitoring device in the system.
5. Loads that start or stop affect the load profiles for any corresponding upstream metered data with a direct or indirect link to that load.

6. Voltage characteristics (fundamental, harmonic, symmetrical components) are relatively consistent for all monitoring devices on the same bus.

7. Transformer losses on the electrical system are minimal with respect to the loads downstream from the transformer.

8. General correlation (over time) of loads between monitoring devices indicates either a direct or indirect link.

9. Multiple unmetered loads at a point in the power system are aggregated into a single unknown load.

Any of the foregoing assumptions and parameters can be combined for a radial-fed electrical power system. For example, in a specific embodiment, any combination of the following rule-based assumptions and parameters may or may not be utilized:

1. Power is higher the further upstream (closer to the top of the hierarchy) a monitoring device is, assuming no intervening upstream transformers or other energy conversion elements.

2. Harmonic values are generally lower the further upstream a monitoring device is.

3. Transformers can vary the voltages and currents.

4. Total power flow is higher upstream than downstream.

5. The power system may be a radial-fed system.

6. Two monitoring devices will not be installed at the same point, though this parameter is not necessarily a requirement in other aspects or embodiments.

7. Monitoring devices with the same voltage distortion are adjacently connected.

8. The total load measured at a specific hierarchical level is equal (excluding losses) to the sum of all measured and unmeasured loads directly linked to that hierarchical level.

Monitoring devices are considered to be on the same hierarchical level if they are all directly linked to the same reference device. For example, referring to FIG. 7, a simplified one-line diagram of a utility monitoring system 320 is shown having five distinct levels represented by 323a,b,c,d,e. In the specific case of a power monitoring system, each level represents a feeder to which multiple monitoring devices can be directly linked. All monitoring devices directly linked to a feeder are considered to be on the same feeder level. Thus, the main 322 is directly linked to the feeder 323a, and thus exists on its own level in the hierarchy. Feeder 323b directly links to three monitoring devices, and therefore comprises another distinct level. Feeder 323c comprises another level distinct from feeders 323a and 323b because the monitoring devices directly linked to feeder 323c are not directly linked to feeders 323a or 323b. In the case of a water, air, gas, and steam systems, each level may be represented by a header instead of a feeder.

A specific aspect of the auto-learned hierarchy algorithm 400 in accordance with an embodiment of the present invention is flow-charted in FIGS. 9-11A. The algorithm 400 first checks whether there is more than one monitoring device in the system (402), and if not, the algorithm ends. If more than one monitoring device is present, electrical data is taken from each monitoring device ($M_1, M_2, \ldots, M_k$) and compiled into a Data Table (404). The Data Table tabulates the raw data (such as power, voltage magnitude, voltage distortion, current magnitude, current distortion, or symmetrical component data) taken at regular intervals ($T_1, T_2, \ldots, T_n$) over a given time period. The time period between samples depends on the shortest duty cycle of any load in the power monitoring system. The maximum time period ($T_n$) is determined based on the level of variation of each monitoring device's load in the power monitoring system. The monitoring device with the maximum power in the Data Table is assumed to be a Main (i.e., highest level in the electrical hierarchy) (408). However, the present invention also contemplates multiple hierarchies (i.e., multiple Mains). An example of the Data Table is shown in Table 1 below.

TABLE 1

Data Table Example

| Time | Meter 1 | Meter 2 | Meter 3 | Meter 4 | ... | Meter k |
|---|---|---|---|---|---|---|
| $T_1$ | $D_{11}$ | $D_{21}$ | D31 | $D_{41}$ | ... | $D_{k1}$ |
| $T_2$ | $D_{12}$ | $D_{22}$ | D32 | $D_{42}$ | ... | $D_{k2}$ |
| $T_3$ | $D_{13}$ | $D_{23}$ | D33 | $D_{43}$ | ... | $D_{k3}$ |
| $T_4$ | $D_{14}$ | $D_{24}$ | D34 | $D_{44}$ | ... | $D_{k4}$ |
| . | . | . | . | . | . | . |
| . | . | . | . | . | . | . |
| . | . | . | . | . | . | . |
| $T_n$ | $D_{1n}$ | $D_{2n}$ | $D_{3n}$ | $D_{4n}$ | ... | $D_{kn}$ |

Once the data for the Data Table is accumulated, a Check Matrix is developed. The Check Matrix is a matrix of logical connections based on the Data Table. A zero (0) indicates that no direct link exists between any two monitoring devices, and a one (1) indicates that there is a possible relationship between two monitoring devices. An exemplary Check Matrix is illustrated in Table 2 below. In Table 2, it is assumed that no link exists between Meter 1 and Meter 2. This is because the power measured by Meter 1 exceeds Meter 2 in one entry of the Data Table and the power measured by Meter 2 exceeds Meter 1 in another entry of the Data Table. Meter 1 always correlates with itself so an NA is placed in that cell of the Check Matrix. Only half of the Check Matrix is required due to the redundancy of information.

TABLE 2

Check Matrix Example

| | Meter 1 | Meter 2 | Meter 3 | Meter 4 | ... | Meter k |
|---|---|---|---|---|---|---|
| Meter 1 | NA | 0 | 1 | 1 | ... | 0 |
| Meter 2 | 0 | NA | 1 | 0 | ... | 1 |
| Meter 3 | 1 | 1 | NA | 0 | ... | 1 |
| Meter 4 | 1 | 0 | 0 | NA | ... | 0 |
| . | . | . | . | . | ... | . |
| . | . | . | . | . | . | . |
| . | . | . | . | . | . | . |
| Meter k | 0 | | 1 | 0 | ... | NA |

Once the Check Matrix is determined, the data from each monitoring device in the Data Table is used to develop a Correlation Coefficient Matrix (CCM) shown in Table 3 below. In the CCM, a statistical evaluation is carried out to determine the linear relationship of each monitoring device in the electrical system with respect to the other monitoring devices in the matrix. The correlation coefficient between any two monitoring devices is determined and placed in the appropriate cell in the CCM. In the exemplary Table 3 below, $C_{12}$ is the correlation coefficient of Meter 1 with respect to Meter 2. The higher the correlation coefficient value is, the higher the probability that these two monitoring devices are either directly or indirectly linked. Conversely, the lower this number is, the lower the probability that these two monitoring devices are directly or indirectly linked. Equation 2 below is used to determine the correlation coefficient between any two given monitoring devices:

$$\rho_{x,y} = \frac{\text{Cov}(x, y)}{\sigma_x \sigma_y} \quad \text{(Equation 2)}$$

where: $\rho_{x,y}$ is the correlation coefficient and lies in the range of $-1 \leq \rho_{x,y} \leq 1$; Cov(x,y) is the covariance of x and y; and $\sigma_x$ and $\sigma_y$ are the standard deviations of x and y, respectively.

$$\text{Cov}(x, y) = \frac{1}{n} \sum_{j=1}^{n} (x_j - \mu_y)(y_j - \mu_y) \quad \text{(Equation 3)}$$

where: n is the number of data elements in x and y, and $\mu_x$ and $\mu_y$ are the mean values of x and y respectively.

The diagonal cells of the Correlation Matrix are all always 1 because each meter has 100% correlation with itself. Again, only half of the Correlation Matrix is required due to the redundancy of data (e.g., $C_{12}=C_{21}$).

TABLE 3

Correlation Coefficient Matrix (CCM) Example

|  | Meter 1 | Meter 2 | Meter 3 | Meter 4 | ... | Meter k |
|---|---|---|---|---|---|---|
| Meter 1 | 1 | $C_{12}$ | $C_{13}$ | $C_{14}$ | ... | $C_{1k}$ |
| Meter 2 | $C_{21}$ | 1 | $C_{23}$ | $C_{24}$ | ... | $C_{2k}$ |
| Meter 3 | $C_{31}$ | $C_{32}$ | 1 | $C_{34}$ | ... | $C_{3k}$ |
| Meter 4 | $C_{41}$ | $C_{42}$ | $C_{43}$ | 1 | ... | $C_{4k}$ |
| . | . | . | . | . | 1 | . |
| . | . | . | . | . |  | . |
| . | . | . | . | . |  | . |
| Meter k | $C_{k1}$ | $C_{k2}$ | $C_{k3}$ | $C_{k4}$ | ... | 1 |

Returning to FIG. 9, a list of meters is developed for each level of the hierarchy under consideration. The top-most level is assumed to be the meter with the largest power reading, which is assumed to be a main. Once that meter is found in the Data Table (408), the algorithm 400 places the main in a feeder level list of the hierarchy and clears the list of monitoring devices on the current feeder level in the hierarchy (410). In subsequent iterations through the MAIN LOOP, the algorithm 400 places the reference meter in the previous feeder level list of the hierarchy. It should be understood that on the first iteration, there is no previous level list. The algorithm 400 clears a Correlation Reference Array (CRA) (412), and designates the main as the reference monitoring device (414). An exemplary CRA is shown in Table 4, below, for n iterations for a given feeder level. $C_{51}$ corresponds to the correlation coefficient between meter 5 (the reference meter) and meter 1, $C_{52}$ corresponds to the correlation coefficient between meter 5 and meter 2, and so forth. Initially, the CRA is cleared for each feeder level, and the algorithm 400 develops a new CRA for each feeder level by populating each iteration column with correlation coefficients for all meters on the current feeder level. A specific example is explained in connection with Table 5 below.

The Correlation Coefficient Matrix (CCM) is calculated based on the power data (416). In the first iteration, the only known element in the hierarchy is the main, and the hierarchy is auto-learned from the top-most feeder level down, in accordance with some or all of the assumptions or parameters listed above.

TABLE 4

Correlation Reference Array (CRA) Example

| Iteration 1 | Iteration 2 | Iteration 3 | Iteration 4 | Iteration 5 | ... | Iteration n |
|---|---|---|---|---|---|---|
| $C_{51}$ | $C_{51}$ | $C_{51}$ | $C_{51}$ | $C_{51}$ | ... | $C_{51}$ |
| $C_{52}$ | $C_{52}$ | $C_{52}$ | $C_{52}$ | $C_{52}$ | ... | $C_{52}$ |
| $C_{53}$ | $C_{53}$ | $C_{53}$ | $C_{53}$ | $C_{53}$ | ... | $C_{53}$ |
| $C_{54}$ | $C_{54}$ | $C_{54}$ | $C_{54}$ | $C_{54}$ | ... | $C_{54}$ |
| ... | ... | ... | ... | ... | ... | ... |
| $C_{5m}$ | $C_{5m}$ | $C_{5m}$ | $C_{5m}$ | $C_{5m}$ | ... | $C_{5m}$ |

Figure 10:
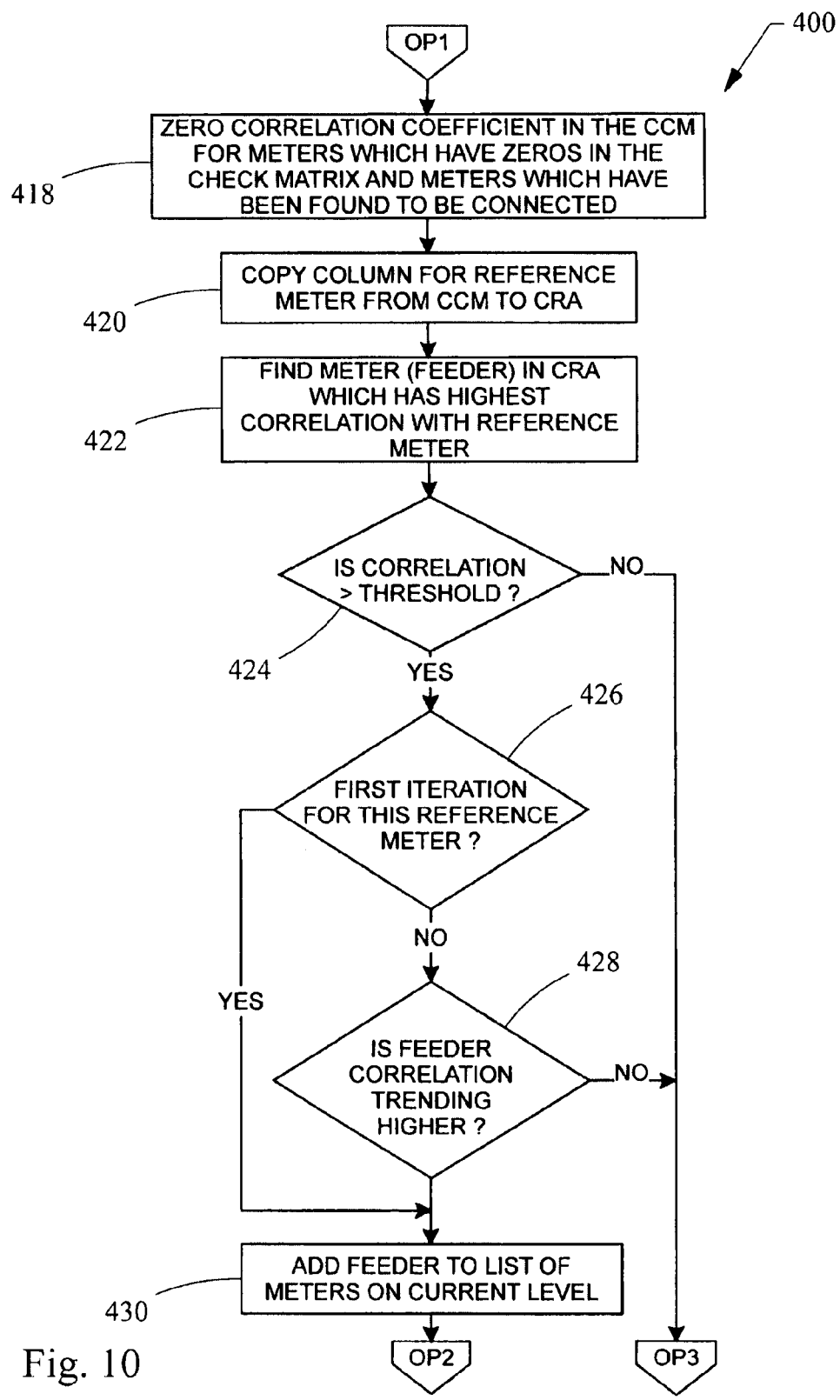

Continuing with FIG. 10, the algorithm 400 zeros the correlation coefficients in the CCM for meters that have zeros in the Check Matrix and meters that have already been found to be connected (418). The column for the reference monitoring device is copied from the CCM to the CRA (420). A specific example will be explained next in connection with Table 5 below. Assume that meter 5 in the CCM is designated as the reference meter (414). The algorithm 400 calculates the CCM based on the Data Table (416) and zeroes the correlation coefficient(s) in the CCM for meters that have zero in the Check Matrix and meters that have been found to be connected (418). The column in the CCM corresponding to meter 5 is copied into the column Iteration 1 of the CRA. Referring to Table 5, meter 11 has the highest correlation with meter 5 of 0.649, and meter 11 is marked as connected with meter 5 for the current feeder level.

In Iteration 2, meter 11's power is subtracted from meter 5's power in the data table, and the meter 5-11 correlation coefficient drops to −0.048 in Iteration 2, which provides a high degree of confidence that meter 11 is interrelated with meter 5. Also noteworthy is that some meter's correlation coefficients trend higher as the iterations progress. For example, the correlation coefficients for meter 18 relative to meter 5 gradually increase from 0.296 in Iteration 1 to 0.417 in Iteration 2 to 0.436 in Iteration 3 to 0.525 in Iteration 4 and finally to 0.671 in Iteration 5, which is the highest correlation coefficient among all the meters (meter 5 correlated with itself is always 1.0, so its correlation coefficient is ignored). This increasing trend also provides a high degree of confidence that meter 18 is also directly linked with meter 5, and this link is finally confirmed in Iteration 5. The same increasing trends can be observed for meters 12 and 15, for example. In Iteration 7, none of the correlation coefficients exceed a threshold, and the algorithm 400 proceeds to analyze the next feeder level. By Iteration 7, the algorithm 400 has determined that meters 11, 12, 14, 15, 18, and 20 are directly linked with meter 5.

TABLE 5

CRA Example With Exemplary Correlation Coefficients

|  | Iteration 1 | Iteration 2 | Iteration 3 | Iteration 4 | Iteration 5 | Iteration 6 | Iteration 7 |
|---|---|---|---|---|---|---|---|
| 5-1 | 0.020 | −0.029 | 0.010 | 0.016 | −0.037 | −0.004 | 0.007 |
| 5-2 | 0.043 | −0.020 | −0.037 | −0.009 | −0.095 | −0.091 | −0.099 |

TABLE 5-continued

CRA Example With Exemplary Correlation Coefficients

|  | Iteration 1 | Iteration 2 | Iteration 3 | Iteration 4 | Iteration 5 | Iteration 6 | Iteration 7 |
| --- | --- | --- | --- | --- | --- | --- | --- |
| 5-3 | 0.067 | 0.079 | 0.017 | 0.024 | −0.052 | −0.046 | −0.009 |
| 5-4 | 0.018 | −0.024 | −0.038 | −0.018 | 0.037 | 0.015 | 0.037 |
| 5-5 | 1.000 | 1.000 | 1.000 | 1.000 | 1.000 | 1.000 | 1.000 |
| 5-6 | 0.058 | 0.022 | −0.016 | −0.015 | −0.035 | −0.010 | 0.029 |
| 5-7 | −0.042 | −0.005 | 0.001 | 0.054 | 0.033 | 0.026 | 0.031 |
| 5-8 | −0.034 | −0.016 | −0.057 | −0.058 | 0.005 | −0.034 | −0.049 |
| 5-9 | 0.418 | 0.386 | 0.308 | 0.292 | 0.189 | 0.099 | 0.136 |
| 5-10 | 0.022 | 0.077 | 0.016 | 0.014 | −0.016 | −0.018 | 0.022 |
| 5-11 | 0.649 | −0.048 | −0.090 | −0.095 | −0.076 | −0.077 | −0.014 |
| 5-12 | 0.344 | 0.506 | 0.628 | 0.725 | 0.047 | −0.007 | 0.016 |
| 5-13 | −0.038 | −0.036 | 0.038 | 0.017 | −0.046 | −0.023 | −0.010 |
| 5-14 | 0.483 | 0.591 | 0.072 | 0.044 | 0.066 | −0.006 | 0.004 |
| 5-15 | 0.043 | 0.161 | 0.210 | 0.263 | 0.417 | 0.587 | 0.031 |
| 5-16 | 0.024 | 0.045 | 0.055 | 0.044 | −0.017 | −0.010 | 0.022 |
| 5-17 | −0.057 | −0.063 | −0.101 | −0.090 | −0.061 | −0.048 | −0.049 |
| 5-18 | 0.296 | 0.417 | 0.436 | 0.525 | 0.671 | 0.113 | 0.165 |
| 5-19 | −0.046 | −0.053 | −0.057 | −0.047 | −0.046 | −0.050 | −0.034 |
| 5-20 | 0.398 | 0.549 | 0.633 | 0.128 | 0.069 | 0.054 | 0.061 |
| 5-21 | −0.060 | −0.017 | 0.028 | 0.080 | −0.013 | 0.010 | 0.005 |

Still referring to FIG. 10, the algorithm 400 finds the monitoring device (feeder) in the CRA that has the highest correlation with the reference monitoring device (422). If the correlation does not exceed a threshold (0.5 in a preferred embodiment), the algorithm 400 continues to FIG. 11A (OP3), such as in the case of Iteration 7 in Table 5 shown above.

Otherwise, the algorithm 400 determines whether the current iteration is the first iteration for the reference monitoring device (426), and if not, determines whether the feeder correlation is trending higher (428). If the feeder correlation is not trending higher, the algorithm 400 continues to FIG. 11A (OP3). A higher trend is an indication that the monitoring device is likely on the current level of the hierarchy under consideration.

Figure 11A:
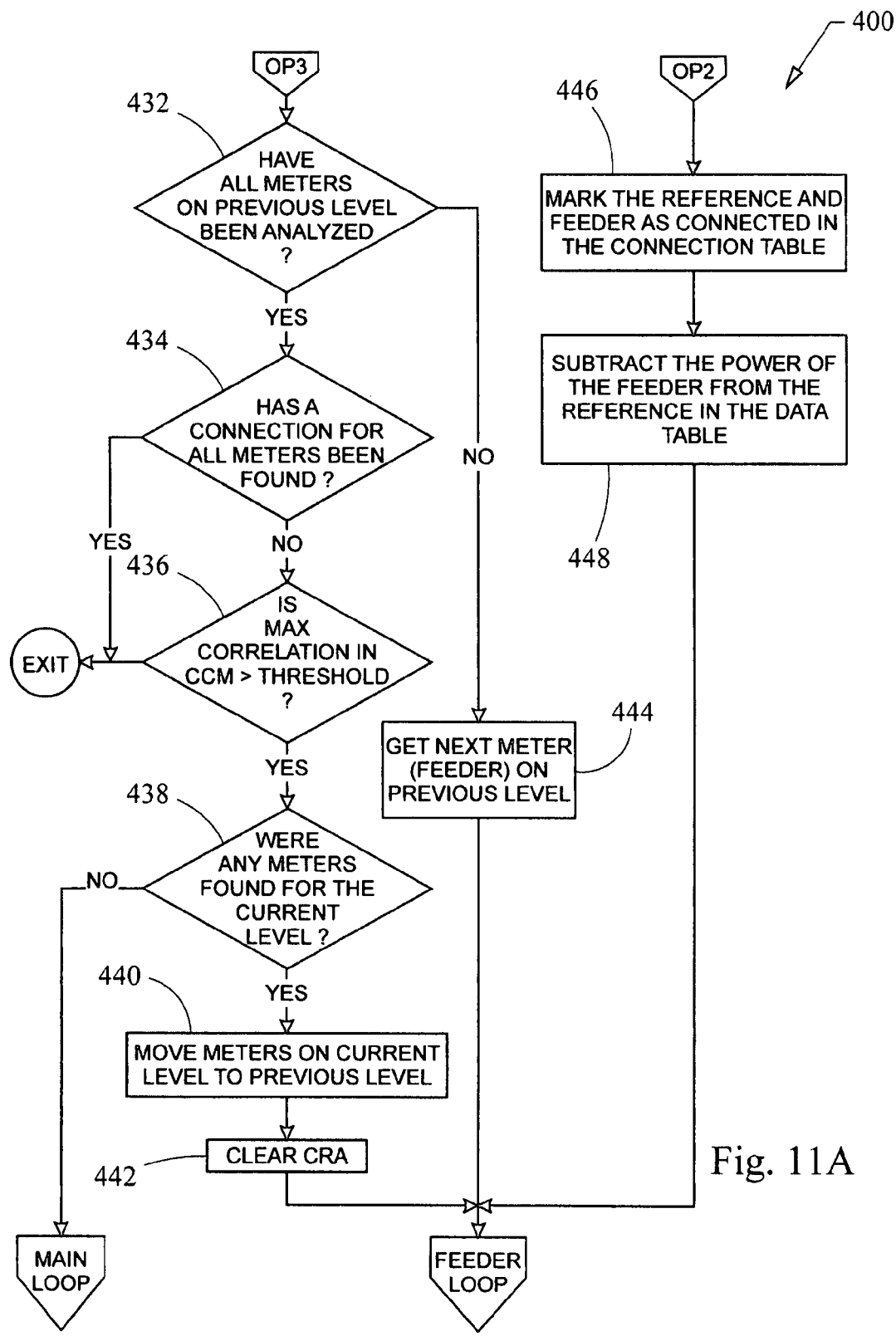

If the current iteration is the first iteration for the reference monitoring device, the feeder is added to the list of monitoring devices on the current level of the hierarchy (430), and the algorithm 400 continues to FIG. 11A (OP2). The reference monitoring device and the feeder are designated as directly linked (or interrelated) in a connection table (446), and the power associated with the feeder is subtracted from the reference monitoring device in the data table (448). The connection table maintains a list of devices and their interrelationships (for example, whether they are directly linked). By subtracting the power of the feeder associated with the highest correlation coefficient relative to the reference monitoring device, other feeders (monitoring devices) connected to the reference monitoring device will see their correlation coefficients increase. The algorithm 400 returns to the FEEDER LOOP of FIG. 9, and the next iteration continues with the remaining monitoring devices.

Figure 9:
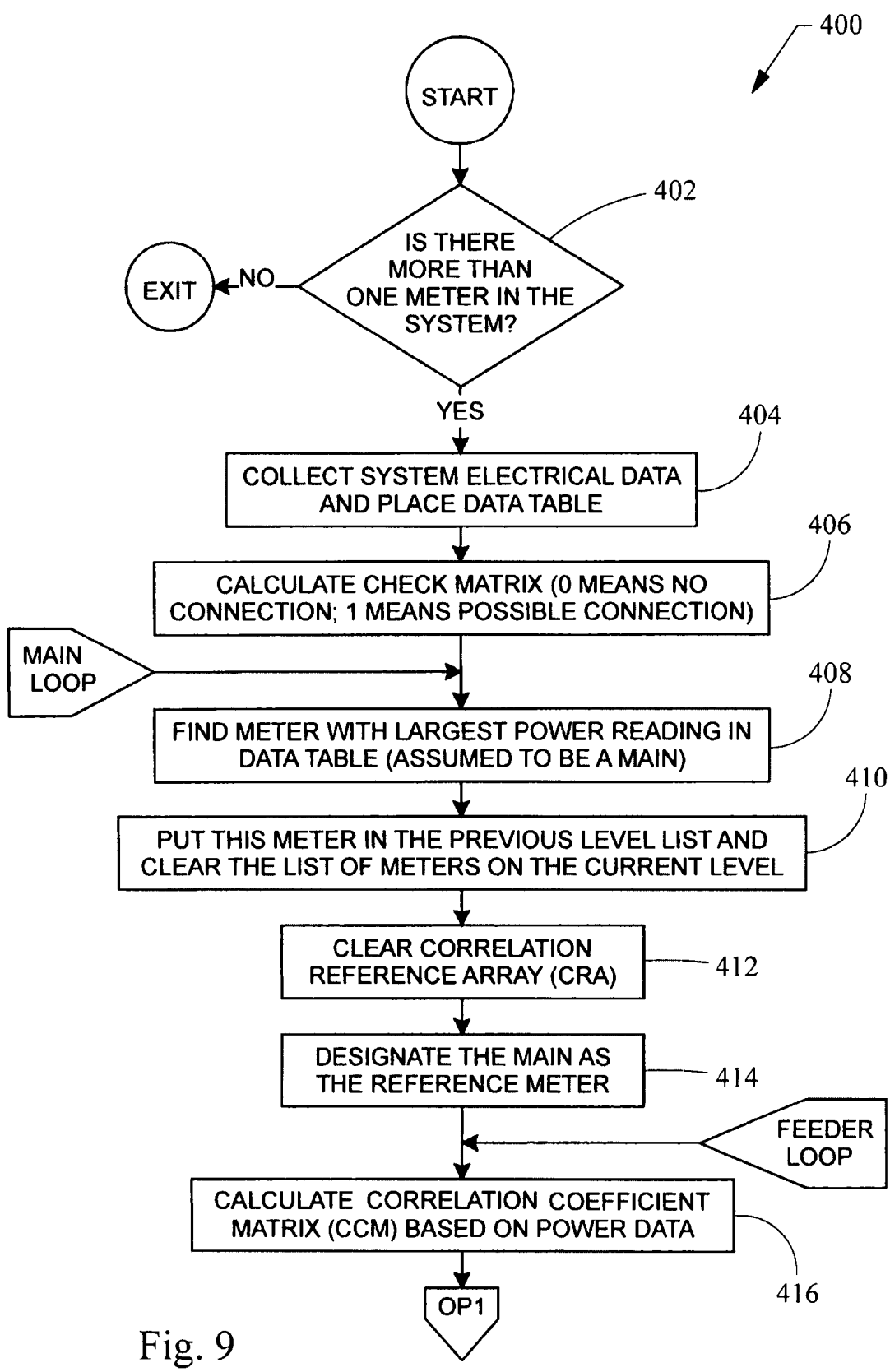

Turning now to the OP3 function, the algorithm 400 determines whether all monitoring devices on the previous level have been analyzed (432), and if not, the next monitoring device (feeder) is obtained on the previous level, and the algorithm 400 returns to the FEEDER LOOP of FIG. 9. If all monitoring devices on the previous level have been analyzed, the algorithm 400 checks whether a connection has been found for all monitoring devices in the hierarchy (434). If so, the algorithm 400 exits. If not, the algorithm 400 checks whether the highest correlation coefficient in the CCM exceeds a threshold (436). If not, the algorithm 400 exits. If so, the algorithm 400 determines whether any more monitoring devices are found for the current level (438). If not, the algorithm 400 returns to the MAIN LOOP in FIG. 9. If so, the algorithm moves the monitoring devices on the current level to the previous level (440) and clears the CRA (442). The algorithm returns to the FEEDER LOOP of FIG. 9 to determine the relationships among the remaining monitoring devices on the current level.

Figure 11B:
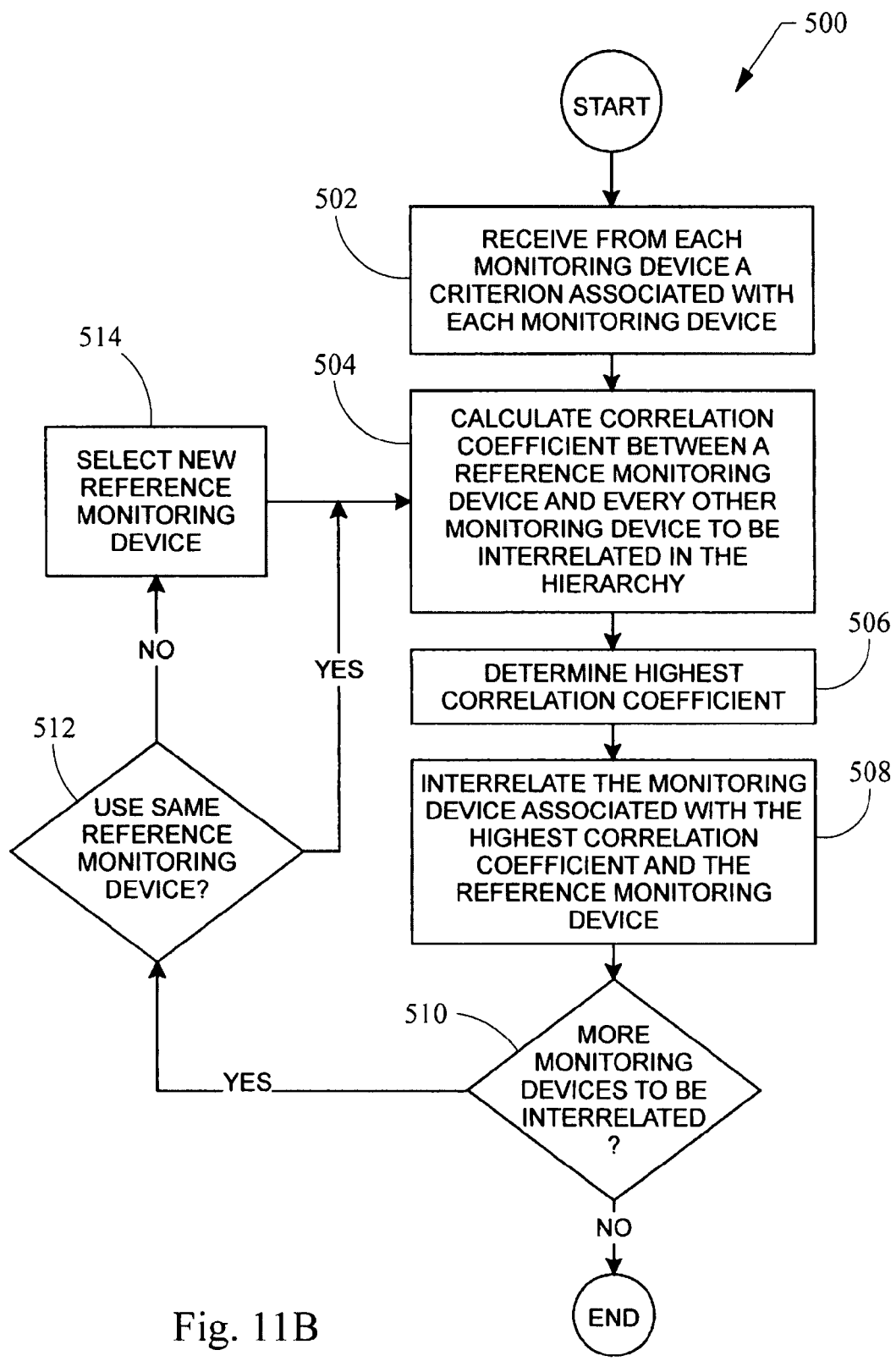
FIG. 11B is a flow chart diagram of an auto-learned hierarchy algorithm in accordance with another embodiment of the present invention.

An auto-learned hierarchy algorithm 500 according to another embodiment of the present invention is illustrated in FIG. 11B. The algorithm 500 starts by receiving from each monitoring device a criterion associated with each monitoring device (502). The criterion can be an electrical parameter, such as power, voltage, current, current distortion, voltage distortion, or energy, or a parameter associated with any WAGES utility, such as volume (BTU, MBTU, gallons, cubic feet) per unit time. The monitoring devices can be power monitoring devices. For example, when the criterion is a voltage distortion, monitoring devices on the same level of the hierarchy will have roughly the same voltage distortion. Additionally or alternatively, the algorithm can use the harmonic distortion values to verify the hierarchy determined by the correlations based on power criteria. Harmonic distortion can also be used by the algorithm to better predict unknown candidates with greater accuracy. For example, a monitoring device may be marginally correlated with a reference device such that the algorithm cannot determine whether a direct link exists or not. Harmonic distortion can rule in or rule out a potential interrelationship depending upon the harmonic distortion values of the neighboring devices on the same level as the monitoring device in question. For example, a different harmonic distortion returned for the monitoring device in question could rule it out as being directly linked with a device on the previous level.

The algorithm 500 calculates a correlation coefficient between a reference monitoring device and every other monitoring device to be interrelated in the hierarchy (504). The algorithm 500 determines the highest correlation coefficient (506) and interrelates the monitoring device associated with the highest correlation coefficient and the reference monitoring device (508). The algorithm 500 checks whether more monitoring devices are to be interrelated (510), and if not, the algorithm 500 ends. If so, the algorithm 500 checks whether to use the same reference monitoring device (512), and if so, recalculates the correlation coefficients (504). Otherwise, the algorithm 500 selects a new reference monitoring device (514), and recalculates the correlation coefficients (504).

Figure 11C:
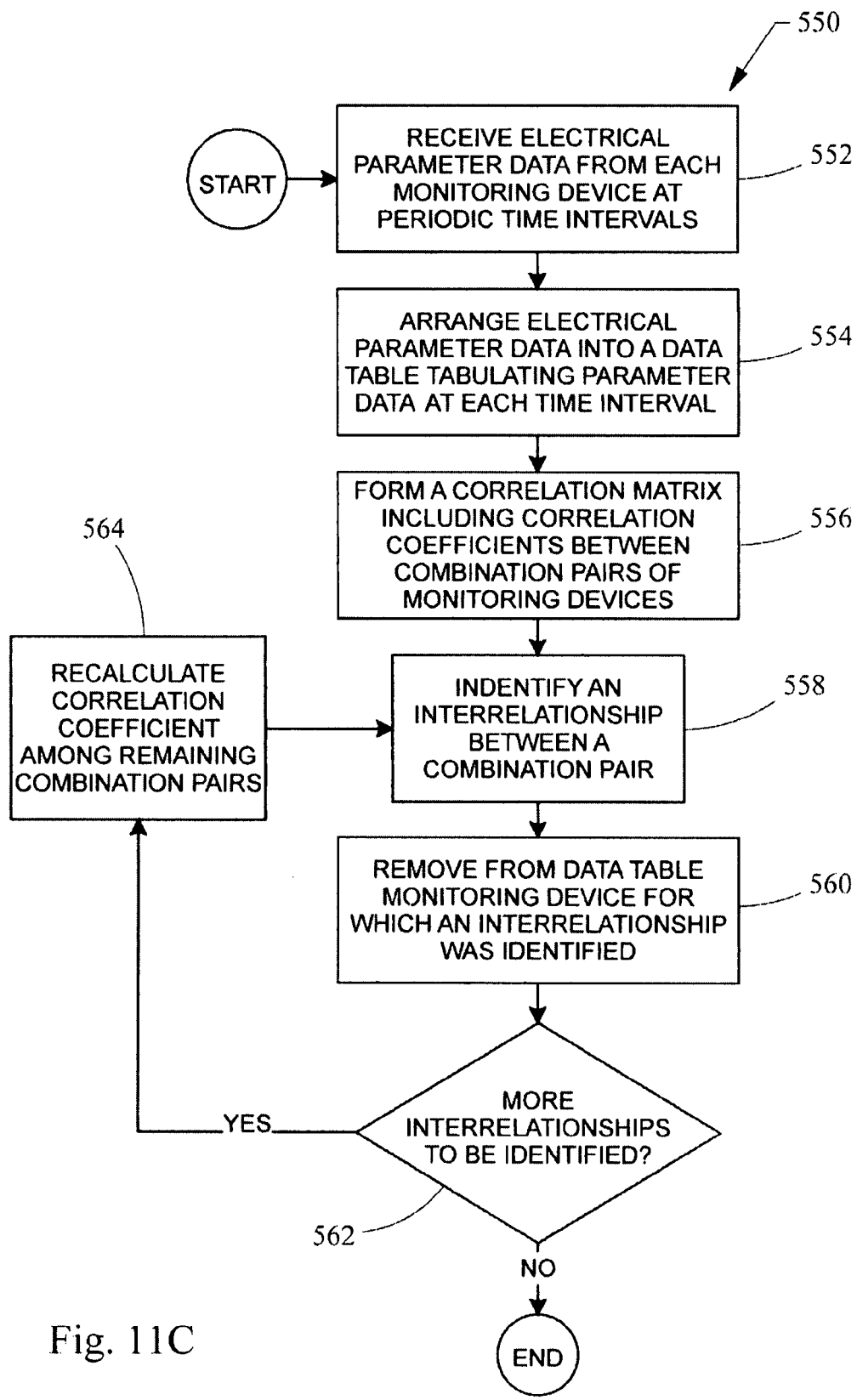
FIG. 11C is a flow chart diagram of an auto-learned hierarchy algorithm in accordance with still another embodiment of the present invention.

An auto-learned hierarchy algorithm 550 according to still another embodiment of the present invention is illustrated in FIG. 11C. The algorithm 550 starts by receiving electrical parameter data from each monitoring device at periodic time intervals (552). The algorithm 550 arranges the electrical parameter data into a data table that tabulates the parameter data at each time interval (554). A correlation matrix is formed that includes correlation coefficients between combination pairs of monitoring devices (556). The algorithm 550 identifies an interrelationship between a combination pair (558) and removes from the data table the power associated with the monitoring device for which an interrelationship was identified (560). If no more interrelationships are to be identified (562), the algorithm 550 ends. Otherwise, it recalculates correlation coefficients among the remaining combination pairs (564) and identifies another interrelationship between the remaining combination pairs (558). This process is repeated until all interrelationships among the monitoring devices have been identified.

The auto-learned hierarchy algorithm according to the various embodiments of the present invention is operable in both radial-fed and multiple radial-fed systems. In multiple radial-fed systems, the algorithm first determines the main meter having the highest power, then determines the hierarchy for that system first before proceeding to the next system(s) having lower power ratings.

The auto-learned hierarchy algorithm has been discussed in various embodiments in which the hierarchy is developed from the top-most level towards the bottom-most level. In an alternate embodiment, an auto-learned hierarchy algorithm develops a hierarchy from the bottom-most level based on events local to each level. For example, monitoring devices proximate to an event will 'see' an event, such as a load turning on or off, before monitoring devices remote from the event will see it. The algorithm recognizes interrelationships among monitoring devices based on the occurrences of events and the timestamps associated with each monitoring device as to when it became aware of an event. By mapping out a chronology of when each monitoring device in the system perceives an event, conclusions can be automatically drawn based upon the time order in which monitoring device perceived that event as to which meters are interrelated (directly linked).

Referring back to FIG. 1, the automated data integrated monitoring system 100 produces contextual data 108 from the data alignment system 104 and the hierarchy classification system 106. The contextual data 108 contains the data from each monitoring device in context with every other monitoring device and is thus more valuable to the user. Contextual analysis of the measured data can be performed, which involves an assessment of the data such that specific external parameters from each monitoring device are aligned or are made known. The primary external parameters of concern include:

The temporal position of each monitoring device's data in the utility system 102 relative to every other monitoring device's data in the utility system 102; and The spatial position of each monitoring device M in the utility system 102 with respect to every other monitoring device M in the utility system 102.

Evaluating all the monitoring data accumulated from the utility system 102 in context will provide a degree of knowledge about the utility system 102 that heretofore was unavailable. Because the information from the entire system (software and monitoring devices) is integrated together through a uniform context, this approach to monitoring a utility system is referred to as Integrated Monitoring (IM).

A useful analogy of the IM approach according to the present invention is the central nervous system of the human body. The brain (software) knows what is going on with the entire body (the monitoring devices) relative to time and position. If a toe is stubbed, the brain sends a signal for the body to react in some manner. Similarly if an electrical event occurs, the IM algorithms executed by the monitoring system software provides useful information to the user on the symptoms throughout the monitored system, potential sources of the problem, and possible solutions or recommendations.

The present invention involves integrating data based on analysis of the data from each monitoring point using special algorithms (for example, a data alignment algorithm and an auto-learned hierarchy algorithm) in the monitoring system software. In the data alignment system 104, subtle but measurable changes in the data's frequency and amplitude are analyzed from all data sources. These changes are used to establish both the common point of data alignment for all data sources and a data source's position in the electrical system with respect to other data sources. Because the process of integrating the system data is performed automatically on algorithms in the monitoring system software, much of the effort and expense required by the user is eliminated. More arbitrary and substantial variations of the parameters being analyzed offers quicker integration of the system data.

There are several benefits associated with IM that are beyond what is presently available including:

The automated IM approach greatly reduces the existing requirements for the user to manually provide detailed information about the power system layout in order to put the system data into context. The IM algorithms analyze data from each monitoring point in the electrical system to automatically determine the system layout with little or no user involvement, saving the user time and resources.

The automated IM approach eliminates the need for special hardware, additional data lines, and, in some cases, monitor accessories. The IM algorithms analyze data from each monitoring point in the electrical system to automatically determine the temporal alignment of the system data, saving the user equipment and labor costs.

The automated IM approach allows an easier configuration of monitoring hardware and software. This is because the IM algorithms automatically put the monitoring information into context throughout the system. Once the monitoring devices are in context, additional decisions regarding hardware and software configuration can automatically be made by the IM algorithms. One example would be setting a monitoring device's under-voltage threshold depending on the monitoring device's location within the electrical system. Again, the automated IM approach saves the user time and resources.

Figure 12:
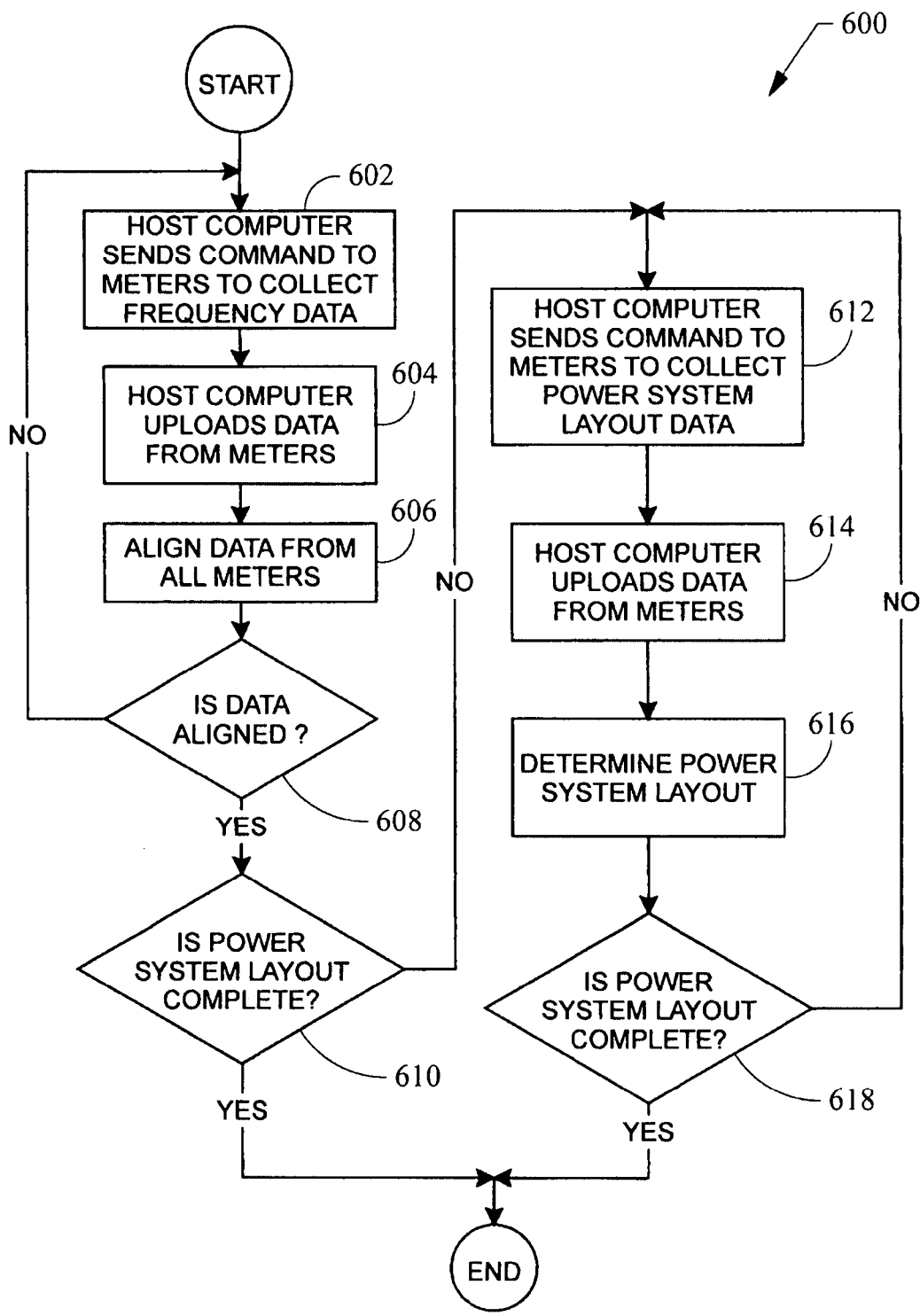
FIG. 12 is a flow chart diagram of an automated integrated monitoring algorithm in accordance with an embodiment of the present invention.

An automated IM algorithm 600 according to an embodiment of the present invention is illustrated in FIG. 12. The algorithm 600 starts by sending a command to the monitoring devices to collect frequency data (602). Data from the monitoring devices is uploaded to the host computer (604) and the data from all the monitoring devices is aligned (606) in accordance with the present invention. When all the data is aligned, the algorithm 600 determines whether the power system layout is complete (610). If so, the algorithm 600 ends, and the contextual data can be used in further software applications.

If the power system layout is not complete, the algorithm 600 sends a command to the monitoring devices to collect power data (612). The host computer running the algorithm 600 uploads the power data from monitoring devices (614) and determines the power system layout (616) in accordance with the present invention. This procedure is repeated until the power system layout is complete (618) at which point the algorithm ends.

Challenges of Aligning Multiple Devices

Empirical data has shown that while alignment between many device pairs is obtainable, alignment between other device pairs can be more challenging. Two devices (a device pair) that are difficult to align with each other are said to have a "noisy" relationship. One approach for solving these noisy meter relationships was to take multiple data samples from the device pair in question and pass these samples through the data alignment algorithm described above. Once a given number of samples are taken from the noisy device pair, the conclusions from each pass are analyzed to determine the most consistent answer (i.e., the statistical mode). It should be noted that the conclusions from this technique include the probable cycle count offset between a device pair and the ratio of the highest correlation to the second highest correlation from a device pair. There are several shortcomings to this approach: (1) it may still provide an incorrect answer; (2) data must be collected multiple times from the questionable device pair making the entire data alignment process take longer; (3) the communications network experiences much heavier traffic due to the larger amounts of data that must be repeatedly passed between the devices and the software; and (4) it is difficult to determine how many data samples are enough to provide an accurate solution.

Figure 14A:
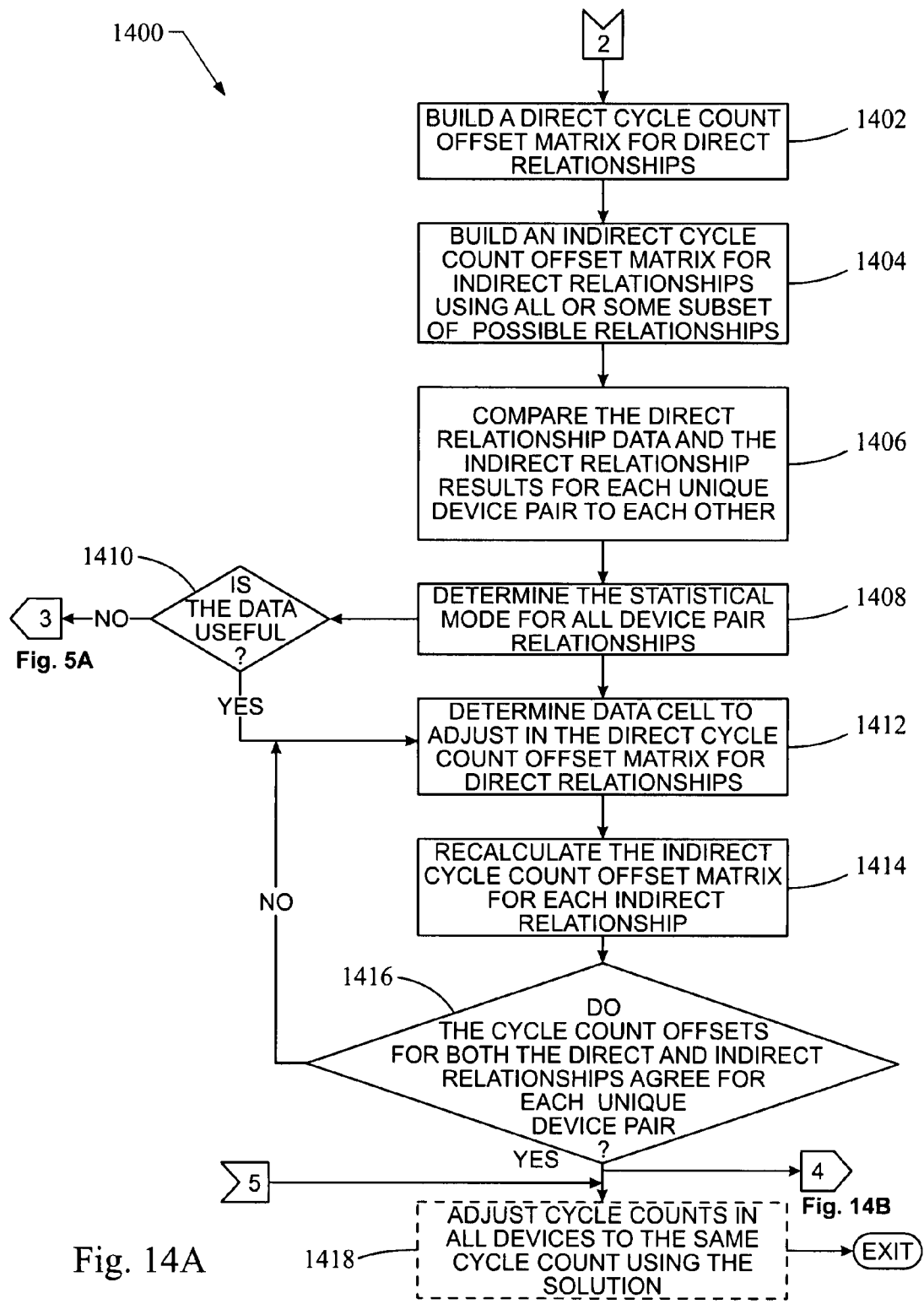
FIG. 14A is a flow chart diagram of a noisy data alignment algorithm in accordance with an aspect.

It became apparent that a solution needed to be found to increase the robustness of the data alignment algorithm discussed above where noisy device pair relationships were involved. For convenience only, the aspects, techniques, methods, algorithms, and implementations discussed below in connection with aligning "noisy" devices shall be referred to as "the noisy data alignment" algorithm. This phrase may also be variously referred to herein as an implementation, a method, a process, a technique, a solution, or an aspect. It is expressly understood that this phrase is merely for convenience only and the selected terms in the phrase are not intended to limit the aspects disclosed herein in any manner. An example of a noisy data alignment algorithm 1400 is shown in FIG. 14A, which may be part of the data alignment system 104.

The noisy data alignment techniques disclosed below are directed to satisfying these and other needs and solving these and other problems. Advantages of these techniques include: (1) reduces (or even eliminates) additional operations of the data alignment algorithm; (2) provides a solution for "noisy" meter relationships; (3) increases the robustness of the data alignment algorithm; and (4) increases the overall speed and efficiency of the data alignment process. Additional advantages and results are set forth elsewhere herein.

Direct and Indirect Relationships in the Cycle Count Offset Matrix

As previously stated, each device that evaluates signals on an interconnected electrical grid experiences frequency deviations synchronously with every other device on the grid because frequency changes are reflected across the entire grid. Therefore, the cycle count of each device is an integer multiple of cycles apart from every other device's cycle count at any given time. The cycle count offset (or difference) between each device pair varies depending on when each device's cycle count was initiated with respect to the other devices. The data alignment algorithm 180 disclosed above determines the cycle count offset between any two devices.

The noisy data alignment solution provides an unexpected improvement over the data alignment algorithm 180 because it was empirically discovered that the concept of cycle count relationships between discrete devices can be expanded to include indirect cycle count relationships over the entire monitoring system. Each system has its own unique solution that can be solved much like solving a puzzle. By exploiting the indirect cycle count relationships, the noisy data alignment techniques automatically find a unique solution between "noisy" device pairs that provides a very high degree of confidence if not total confidence in the relationship.

As used hereinafter, a monitoring device is designated by the letter D, and the subscript refers to a unique monitoring device within a monitoring system. The letter M refers to a cycle count and its subscript refers to the monitoring device with which the cycle count is associated. $D_{ij}$ refers to a device pair, where i and j refer to distinct monitoring devices in the monitoring system and $1 \leq i \leq n$ and $1 \leq j \leq n$ and $i \neq j$. The monitoring system has a number, n, of monitoring devices that are capable of communicating signal data indicative of frequency variations to the data alignment system 104. $M_{ij}$ refers to a cycle count offset (or difference) associated with a device pair, $D_{ij}$. $M_k$ refers to a cycle count associated with a device other than $D_i$ and other than $D_j$.

The direct cycle count offset ($M_i$, $M_j$) between a device pair ($D_i$, $D_j$) can be determined directly by the following equations:

$$M_{ij} = M_i - M_j \qquad \text{(Equation 4)};$$

$$M_{ji} = M_j - M_i \qquad \text{(Equation 5)};$$

$$M_{ij} = -M_{ji} \qquad \text{(Equation 6)},$$

where $M_i$ is the cycle count of one device $D_i$ and $M_j$ is the cycle count of another device $D_j$ (both taken synchronously). For example, if $M_1$ has a cycle count of 20 and $M_2$ has a cycle count of 25, then the direct cycle count offset between the two devices (i.e., the device pair), $M_{12}$, equals −5 (note that $M_{21}$ will equal +5). When i=j, the direct cycle count offset is always zero because the equation is calculating the offset of a device with itself. Hence, the diagonal of direct cycle count offset matrices is always equal to zero.

TABLE 6

Direct Cycle Count Offset Matrix Construct

|       | $M_1$    | $M_2$    | $M_3$    | $M_4$    | ...       | $M_j$    |
|-------|----------|----------|----------|----------|-----------|----------|
| $M_1$ | 0        | $M_{12}$ | $M_{13}$ | $M_{14}$ | (−) ...   | $M_{1j}$ |
| $M_2$ | $M_{21}$ | 0        | $M_{23}$ | $M_{24}$ | (−) ...   | $M_{2j}$ |
| $M_3$ | $M_{31}$ | $M_{32}$ | 0        | $M_{34}$ | (−) ...   | $M_{3j}$ |
| $M_4$ | $M_{41}$ | $M_{42}$ | $M_{43}$ | 0        | (−) ...   | $M_{4j}$ |
| .     | .        | .        | .        | .        | 0         | .        |
| .     | .        | .        | .        | .        |           | .        |
| $M_i$ | $M_{i1}$ | $M_{i2}$ | $M_{i3}$ | $M_{i4}$ | ...       | 0        |

A Cycle Count Offset Matrix is built by entering the cycle count offset of each device with respect to every other device on the monitoring system using Equations 4-6 (1402). Table 6 illustrates the construction of a direct cycle count offset matrix. All of the rows and columns correspond to every capable device in the power monitoring system. Again, the elements in the matrix's diagonal are equal to zero because the cycle count offset between any device and itself is equal to zero.

All cycle count offset matrices are in the form of a skew-symmetric matrix. In linear algebra, a skew-symmetric (or anti-symmetric) matrix is a square matrix A whose transpose is also its negative; that is, it satisfies the equation:

$$A^T = -A \quad \text{(Equation 7)}$$

In component form, $A=(a_{ij})$ where $a_{ij}=-a_{ji}$ for all i and j. All main diagonal entries of a skew-symmetric matrix have to be zero, and so the trace is zero. Thus, the cycle count offset matrix can be of the skew-symmetric matrix type.

Because the cycle counts for all devices in a power monitoring system 120 increment together as explained above, the cycle count offsets between any device pair will be constant. Therefore, the cycle count offset matrix is both fixed or constant and unique for any given power monitoring system (provided that no device resets occur while the noisy data alignment algorithm is operating). If a device or devices are reset while the noisy data alignment algorithm 1400 is operating, the algorithm 1400 will note the reset(s) and reinitiate itself to create a new direct cycle count offset matrix (1402), which is fixed/constant and unique.

By exploiting the concepts relating to the data alignment algorithm 180 and the breakthrough discovery that the cycle count offset matrix is fixed/constant (the cycle counts from all devices increment together) and unique (there is only one correct solution), the solution of $M_{ij}$ can be derived based upon the cycle count offset relationships of multiple devices. In short, it is possible to deduce the cycle count offset between $M_{ij}$ by analyzing the cycle count offset relationships between $M_{ik}$ and $M_{jk}$ (and $M_{ki}$ and $M_{kj}$). Furthermore, the intrinsic nature of the cycle count offset matrix necessitates that $M_{ij}$ can be accurately determined by a multitude of unique combinations of the cycle count offset relationships, being limited only by the size of the matrix (n×n). So, the cycle count offset between a device pair can be arrived at directly by determining the relationship between any two given devices ($M_{ij}$) or indirectly by incorporating the relationships between other devices ($M_{ik}$–$M_{jk}$, etc.).

Table 7 illustrates an exemplary direct cycle count offset matrix in skew-symmetric form with exemplary data taken from 6 devices, resulting in a 6×6 matrix. The data in each cell of the matrix is the direct cycle count offset between every combination of device pairs. For example, cell $M_{12}$ is equal to 2, so $M_1$'s cycle counter is two cycles ahead of $M_2$'s cycle counter. Symmetrically, cell $M_{21}$ is equal to –2 because $M_2$'s cycle counter is two cycles behind $M_1$'s cycle counter (see Equation 6).

TABLE 7

Direct Cycle Count Matrix (Example 1)

|  | $M_1$ | $M_2$ | $M_3$ | $M_4$ | $M_5$ | $M_6$ |
|---|---|---|---|---|---|---|
| $M_1$ | 0 | 2 | –4 | –7 | –7 | –7 |
| $M_2$ | –2 | 0 | –6 | –9 | –9 | –9 |
| $M_3$ | 4 | 6 | 0 | –3 | –3 | –3 |
| $M_4$ | 7 | 9 | 3 | 0 | 0 | 0 |
| $M_5$ | 7 | 9 | 3 | 0 | 0 | 0 |
| $M_6$ | 7 | 9 | 3 | 0 | 0 | 0 |

In this example, the determination of $M_{12}$ (and $M_{21}$) was derived through the direct relationship of $M_1$ and $M_2$. However, it is also possible to determine the cycle count offset relationship between $M_1$ and $M_2$ indirectly using other cells in the cycle count matrix with the following equation:

$$M_{ij} = M_{ik} - M_{jk} \text{ where } k \neq i \neq j \quad \text{(Equation 8)}$$

Additional indirect relationships can be derived based upon 2 to n–1 device pairs for an n×n cycle count offset matrix. While the number of direct relationships is always 1 for any given device pair, the number of indirect relationships that can be derived is based on the size of the n×n matrix.

To illustrate, cell $M_{12}$ from Table 7 can be determined indirectly by finding the difference between two direct cycle count offsets, $M_{13}$ and $M_{23}$:

$$M_{12} = M_{13} - M_{23} = (-4) - (-6) = 2$$

Cell $M_{12}$ from Table 7 can also be determined indirectly by finding the difference between three direct cycle count offsets, $M_{13}$, $M_{43}$, and $M_{42}$:

$$M_{12} = M_{13} - M_{43} - M_{24} = (-4) - (3) - (-9) = 2$$

In this example, up to 5 device pair relationships (n–1 where n=6) may be used to derive the cycle count offset for $M_{12}$. One example of deriving $M_{12}$ from 5 device pair relationships is:

$$M_{12} = M_{13} - M_{43} - M_{54} - M_{65} - M_{26} = (-4) - (3) - (0) - (0) - (-9) = 2$$

It should be noted that there are numerous unique combinations of device pair relationships that can be used to indirectly derive the cycle count offset for a given device pair.

Table 8 illustrates dozens of unique combinations of equations that can be derived from the relationships in a given sized (in this case, 6×6) cycle count offset matrix. It should be readily apparent that systems with more monitoring devices have a proportionally larger number of unique combinations that can be derived compared to systems with fewer monitoring devices.

TABLE 8

Sample Direct and Indirect Cycle Count Offset Equations for Table 7

| Device Pair | Equation | Result | Relationship Type |
|---|---|---|---|
| $M_{12} =$ | $M_1 - M_2$ | 2 | Direct |
| $M_{12} =$ | $M_{13} - M_{23}$ | 2 | Unique indirect |
| $M_{12} =$ | $M_{14} - M_{24}$ | 2 | relationships derived |
| $M_{12} =$ | $M_{15} - M_{25}$ | 2 | from two sets of |
| $M_{12} =$ | $M_{16} - M_{26}$ | 2 | device pairs |
| $M_{12} =$ | $M_{13} - M_{43} - M_{24}$ | 2 | Unique indirect |
| $M_{12} =$ | $M_{13} - M_{53} - M_{25}$ | 2 | relationships derived |
| $M_{12} =$ | $M_{13} - M_{63} - M_{26}$ | 2 | from three sets of |
| $M_{12} =$ | $M_{14} - M_{34} - M_{23}$ | 2 | device pairs |
| $M_{12} =$ | $M_{14} - M_{54} - M_{25}$ | 2 | |
| $M_{12} =$ | $M_{14} - M_{64} - M_{26}$ | 2 | |
| $M_{12} =$ | $M_{15} - M_{35} - M_{23}$ | 2 | |
| $M_{12} =$ | $M_{15} - M_{45} - M_{24}$ | 2 | |
| $M_{12} =$ | $M_{15} - M_{65} - M_{26}$ | 2 | |
| $M_{12} =$ | $M_{16} - M_{36} - M_{23}$ | 2 | |
| $M_{12} =$ | $M_{16} - M_{46} - M_{24}$ | 2 | |
| $M_{12} =$ | $M_{16} - M_{56} - M_{25}$ | 2 | |
| $M_{12} =$ | $M_{13} - M_{43} - M_{54} - M_{25}$ | 2 | Unique indirect |
| $M_{12} =$ | $M_{13} - M_{43} - M_{64} - M_{26}$ | 2 | relationships derived |
| $M_{12} =$ | $M_{13} - M_{53} - M_{54} - M_{24}$ | 2 | from four sets of |
| $M_{12} =$ | $M_{13} - M_{53} - M_{56} - M_{26}$ | 2 | device pairs |
| $M_{12} =$ | $M_{13} - M_{63} - M_{64} - M_{24}$ | 2 | |
| $M_{12} =$ | $M_{13} - M_{63} - M_{65} - M_{25}$ | 2 | |
| $M_{12} =$ | $M_{14} - M_{34} - M_{53} - M_{25}$ | 2 | |
| $M_{12} =$ | $M_{14} - M_{34} - M_{63} - M_{26}$ | 2 | |
| $M_{12} =$ | $M_{14} - M_{54} - M_{35} - M_{23}$ | 2 | |
| $M_{12} =$ | $M_{14} - M_{54} - M_{56} - M_{26}$ | 2 | |
| $M_{12} =$ | $M_{14} - M_{64} - M_{36} - M_{23}$ | 2 | |
| $M_{12} =$ | $M_{14} - M_{64} - M_{65} - M_{25}$ | 2 | |
| $M_{12} =$ | $M_{15} - M_{35} - M_{43} - M_{24}$ | 2 | |
| $M_{12} =$ | $M_{15} - M_{35} - M_{63} - M_{26}$ | 2 | |
| $M_{12} =$ | $M_{15} - M_{45} - M_{34} - M_{23}$ | 2 | |
| $M_{12} =$ | $M_{15} - M_{45} - M_{64} - M_{26}$ | 2 | |
| $M_{12} =$ | $M_{15} - M_{65} - M_{36} - M_{23}$ | 2 | |
| $M_{12} =$ | $M_{15} - M_{65} - M_{46} - M_{24}$ | 2 | |
| $M_{12} =$ | $M_{16} - M_{36} - M_{53} - M_{25}$ | 2 | |
| $M_{12} =$ | $M_{16} - M_{36} - M_{43} - M_{24}$ | 2 | |
| $M_{12} =$ | $M_{16} - M_{46} - M_{34} - M_{23}$ | 2 | |
| $M_{12} =$ | $M_{16} - M_{46} - M_{54} - M_{25}$ | 2 | |

TABLE 8-continued

Sample Direct and Indirect Cycle Count Offset Equations for Table 7

| Device Pair | Equation | Result | Relationship Type |
|---|---|---|---|
| $M_{12} =$ | $M_{16} - M_{56} - M_{35} - M_{23}$ | 2 | |
| $M_{12} =$ | $M_{16} - M_{56} - M_{45} - M_{24}$ | 2 | |
| $M_{12} =$ | $M_{13} - M_{43} - M_{54} - M_{65} - M_{26}$ | 2 | Unique indirect |
| $M_{12} =$ | $M_{13} - M_{43} - M_{64} - M_{56} - M_{25}$ | 2 | relationships derived |
| $M_{12} =$ | $M_{13} - M_{53} - M_{65} - M_{46} - M_{24}$ | 2 | from five sets of |
| $M_{12} =$ | $M_{13} - M_{53} - M_{45} - M_{64} - M_{26}$ | 2 | device pairs |
| $M_{12} =$ | $M_{13} - M_{63} - M_{46} - M_{54} - M_{25}$ | 2 | |
| $M_{12} =$ | $M_{13} - M_{63} - M_{56} - M_{45} - M_{24}$ | 2 | |
| $M_{12} =$ | $M_{14} - M_{34} - M_{53} - M_{65} - M_{26}$ | 2 | |
| $M_{12} =$ | $M_{14} - M_{34} - M_{63} - M_{56} - M_{25}$ | 2 | |
| $M_{12} =$ | $M_{14} - M_{54} - M_{65} - M_{36} - M_{23}$ | 2 | |
| $M_{12} =$ | $M_{14} - M_{54} - M_{35} - M_{63} - M_{26}$ | 2 | |
| $M_{12} =$ | $M_{14} - M_{64} - M_{56} - M_{35} - M_{23}$ | 2 | |
| $M_{12} =$ | $M_{14} - M_{64} - M_{36} - M_{53} - M_{25}$ | 2 | |
| $M_{12} =$ | $M_{15} - M_{35} - M_{43} - M_{64} - M_{26}$ | 2 | |
| $M_{12} =$ | $M_{15} - M_{35} - M_{63} - M_{46} - M_{24}$ | 2 | |
| $M_{12} =$ | $M_{15} - M_{45} - M_{34} - M_{63} - M_{26}$ | 2 | |
| $M_{12} =$ | $M_{15} - M_{45} - M_{64} - M_{36} - M_{23}$ | 2 | |
| $M_{12} =$ | $M_{15} - M_{65} - M_{46} - M_{34} - M_{23}$ | 2 | |
| $M_{12} =$ | $M_{15} - M_{65} - M_{56} - M_{45} - M_{24}$ | 2 | |
| $M_{12} =$ | $M_{16} - M_{36} - M_{43} - M_{54} - M_{25}$ | 2 | |
| $M_{12} =$ | $M_{16} - M_{36} - M_{53} - M_{45} - M_{24}$ | 2 | |
| $M_{12} =$ | $M_{16} - M_{46} - M_{54} - M_{35} - M_{23}$ | 2 | |
| $M_{12} =$ | $M_{16} - M_{46} - M_{34} - M_{53} - M_{25}$ | 2 | |
| $M_{12} =$ | $M_{16} - M_{56} - M_{45} - M_{34} - M_{23}$ | 2 | |
| $M_{12} =$ | $M_{16} - M_{56} - M_{35} - M_{43} - M_{24}$ | 2 | |

Innovative Approach to Solving the Noisy Device Pair Relationship

The fact that there are so many relationships (both direct and indirect) for each device pair AND that only one unique solution exists for the direct cycle count offset matrix provides the foundation for the noisy data alignment techniques herein to determine which devices are noisy and to find a solution notwithstanding the noisy relationships. Importantly, where previously data had to be collected multiple times in an attempt to statistically determine the cycle count offsets of discrete device pairs, the noisy data alignment solution herein can confidently determine the entire direct cycle count offset matrix in many cases using only a single data collection pass and iterate to the solution where noisy meters are present.

TABLE 9

Exemplary Device List for Testing

| Device Number | Device Type | IP* | Serial Address |
|---|---|---|---|
| $M_1$ | CM4000T | 158.197.126.27 | 1 |
| $M_2$ | CM4250 | 158.197.126.17 | 1 |
| $M_3$ | CM4000 | 158.197.126.17 | 2 |
| $M_4$ | CM4250 | 158.197.148.21 | 1 |
| $M_5$ | CM4000T | 158.197.148.21 | 2 |
| $M_6$ | CM3350 | 158.197.148.21 | 3 |

To illustrate this noisy data alignment technique, Table 9 lists six exemplary devices commercially available from Square D Company that were tested. These devices were split into three groups and interconnected to the software via Ethernet and daisy-chained RS-485 communications networks. There are a total of fifteen unique combinations of device pairs based on the following equation:

$$\text{Number of Unique Device Parts} = \frac{n(n-1)}{2} \quad \text{(Equation 9)}$$

where n is the number of devices.

Table 10 shows each unique device pair for the exemplary six-device system. The data alignment algorithm 180 was initiated for the six devices and the direct cycle count offsets based on the direct relationships (i.e., the difference between the corresponding cycle counts from each device were determined at the point of the highest correlation coefficient produced by the cross-correlation of signal data from device pairs) were determined for each unique combination of device pairs. It should be readily apparent that no firm conclusions can be drawn from Table 10 regarding its correctness. The data alignment algorithm 180 can only reinitiate and generate multiple instances of the data in Table 10. Statistical analysis would then be carried out to ascertain the most probable cycle count offset for each device pair.

TABLE 10

Direct Cycle Count Offset Table Produced by Data Alignment Algorithm
All Combinations of Device Pair Cycle Count Offsets

| $M_{12}$ | $M_{13}$ | $M_{14}$ | $M_{15}$ | $M_{16}$ | $M_{23}$ | $M_{24}$ | $M_{25}$ | $M_{26}$ | $M_{34}$ | $M_{35}$ | $M_{36}$ | $M_{45}$ | $M_{46}$ | $M_{56}$ |
|---|---|---|---|---|---|---|---|---|---|---|---|---|---|---|
| 2 | −4 | −7 | −7 | −247 | −6 | −9 | −9 | −249 | −3 | −3 | −3 | 0 | 0 | 0 |

The noisy data alignment algorithm collects the results of each device pair cycle count offset from Table 10 and constructs the cycle count offset matrix shown in Table 11, which is a compilation of the direct cycle count offset relationships of each device pair in the matrix form.

TABLE 11

Direct Cycle Count Offset Matrix (Initial Data)

| Device | $M_1$ | $M_2$ | $M_3$ | $M_4$ | $M_5$ | $M_6$ |
|---|---|---|---|---|---|---|
| $M_1$ | 0 | 2 | −4 | −7 | −7 | −247 |
| $M_2$ | −2 | 0 | −6 | −9 | −9 | −249 |
| $M_3$ | 4 | 6 | 0 | −3 | −3 | −3 |
| $M_4$ | 7 | 9 | 3 | 0 | 0 | 0 |
| $M_5$ | 7 | 9 | 3 | 0 | 0 | 0 |
| $M_6$ | 247 | 249 | 3 | 0 | 0 | 0 |

Using the concepts outlined above, a new indirect cycle count offset table is constructed for the indirect cycle count offset relationships (see Table 12) (1404). For the sake of simplicity, Table 12 only includes each of the indirect relationships using two sets of unique device pairs; however, all indirect relationships up to 5 sets of unique device pairs may be used in this example (refer to Table 8 for other unique device pairs for a six-device system). It is not necessary to determine indirect relationships for every combination of device pairs. It suffices to determine indirect relationships for suspect device pairs, such as device pairs whose standard deviation from the mean exceed a threshold when the cycle counters for all of the devices have been reset to the same initial value (typically 0) pseudo-synchronously. In Table 11, suspect pairs include $M_{61}$ and $M_{62}$ (and their corresponding device pairs, $M_{16}$ and $M_{26}$) as these device pairs have cycle count offsets that deviate strongly from the mean cycle count offsets of other device pairs.

The cycle count offset matrix is a 6×6 matrix because there are six devices. There are only four unique indirect equations using two sets of device pairs to solve for each device pair, and each is shown in Table 12. Again, the cells in the matrix diagonal are equal to zero because a device cannot be offset from itself. The algorithm 1400 compares the direct relationship data from the direct cycle count offset matrix and the indirect relationship results from the indirect cycle count offset matrix for each unique device pair to each other (1406). In various aspects, the algorithm 1400 may make this comparison for every device pair or for a subset of device pairs, such as those device pairs whose indirect relationships are suspect. Examples are provided below.

As can be seen in cell $M_{21}$ of Table 12, each of the four indirect equation results agree with the direct equation value given in cell $M_{21}$ of Table 11. Hence, there is a very strong probability that the conclusions given by both tables for cell $M_{12}$ is correct. Note that cell $M_{12}$ is the negative of cell $M_{21}$ as previously shown in Equation 6.

TABLE 12

Indirect Cycle Count Offset Matrix (Initial Data)

| | | | | | |
|---|---|---|---|---|---|
| $M_{11} = 0$ | $M_{12} = M_{13} - M_{23} = 2$ | $M_{13} = M_{12} - M_{32} = -4$ | $M_{14} = M_{12} - M_{42} = -7$ | $M_{15} = M_{12} - M_{52} = -7$ | $M_{16} = M_{12} - M_{62} = -247$ |
| | $M_{12} = M_{14} - M_{24} = 2$ | $M_{13} = M_{14} - M_{34} = -4$ | $M_{14} = M_{13} - M_{43} = -7$ | $M_{15} = M_{13} - M_{53} = -7$ | $M_{16} = M_{13} - M_{63} = -7$ |
| | $M_{12} = M_{15} - M_{25} = 2$ | $M_{13} = M_{15} - M_{35} = -4$ | $M_{14} = M_{15} - M_{45} = -7$ | $M_{15} = M_{14} - M_{54} = -7$ | $M_{16} = M_{14} - M_{64} = -7$ |
| | $M_{12} = M_{16} - M_{26} = 2$ | $M_{13} = M_{16} - M_{36} = -244$ | $M_{14} = M_{16} - M_{46} = -247$ | $M_{15} = M_{16} - M_{56} = -247$ | $M_{16} = M_{15} - M_{65} = -7$ |
| $M_{21} = M_{23} - M_{13} = -2$ | $M_{22} = 0$ | $M_{23} = M_{21} - M_{31} = -6$ | $M_{24} = M_{21} - M_{41} = -9$ | $M_{25} = M_{21} - M_{51} = -9$ | $M_{26} = M_{21} - M_{61} = -249$ |
| $M_{21} = M_{24} - M_{14} = -2$ | | $M_{23} = M_{24} - M_{34} = -6$ | $M_{24} = M_{23} - M_{43} = -9$ | $M_{25} = M_{23} - M_{53} = -9$ | $M_{26} = M_{23} - M_{63} = -9$ |
| $M_{21} = M_{25} - M_{15} = -2$ | | $M_{23} = M_{25} - M_{35} = -6$ | $M_{24} = M_{25} - M_{45} = -9$ | $M_{25} = M_{24} - M_{54} = -9$ | $M_{26} = M_{24} - M_{64} = -9$ |
| $M_{21} = M_{26} - M_{16} = -2$ | | $M_{23} = M_{26} - M_{36} = -246$ | $M_{24} = M_{26} - M_{46} = -249$ | $M_{25} = M_{26} - M_{56} = -249$ | $M_{26} = M_{25} - M_{65} = -9$ |
| $M_{31} = M_{32} - M_{12} = 4$ | $M_{32} = M_{31} - M_{21} = 6$ | $M_{33} = 0$ | $M_{34} = M_{31} - M_{41} = -3$ | $M_{35} = M_{31} - M_{51} = -3$ | $M_{36} = M_{31} - M_{61} = -243$ |
| $M_{31} = M_{34} - M_{14} = 4$ | $M_{32} = M_{34} - M_{24} = 6$ | | $M_{34} = M_{32} - M_{42} = -3$ | $M_{35} = M_{32} - M_{52} = -3$ | $M_{36} = M_{32} - M_{62} = -243$ |
| $M_{31} = M_{35} - M_{15} = 4$ | $M_{32} = M_{35} - M_{25} = 6$ | | $M_{34} = M_{35} - M_{45} = -3$ | $M_{35} = M_{34} - M_{54} = -3$ | $M_{36} = M_{34} - M_{64} = -3$ |
| $M_{31} = M_{36} - M_{16} = 244$ | $M_{32} = M_{36} - M_{26} = 246$ | | $M_{34} = M_{36} - M_{46} = -3$ | $M_{35} = M_{36} - M_{56} = -3$ | $M_{36} = M_{35} - M_{65} = -3$ |
| $M_{41} = M_{42} - M_{12} = 7$ | $M_{42} = M_{41} - M_{21} = 9$ | $M_{43} = M_{41} - M_{31} = 3$ | $M_{44} = 0$ | $M_{45} = M_{41} - M_{51} = 0$ | $M_{46} = M_{41} - M_{61} = -240$ |
| $M_{41} = M_{43} - M_{13} = 7$ | $M_{42} = M_{43} - M_{23} = 9$ | $M_{43} = M_{42} - M_{32} = 3$ | | $M_{45} = M_{42} - M_{52} = 0$ | $M_{46} = M_{42} - M_{62} = -240$ |
| $M_{41} = M_{45} - M_{15} = 7$ | $M_{42} = M_{45} - M_{25} = 9$ | $M_{43} = M_{45} - M_{35} = 3$ | | $M_{45} = M_{43} - M_{53} = 0$ | $M_{46} = M_{43} - M_{63} = 0$ |
| $M_{41} = M_{46} - M_{16} = 247$ | $M_{42} = M_{46} - M_{26} = 249$ | $M_{43} = M_{46} - M_{36} = 3$ | | $M_{45} = M_{46} - M_{56} = 0$ | $M_{46} = M_{45} - M_{65} = 0$ |
| $M_{51} = M_{52} - M_{12} = 7$ | $M_{52} = M_{51} - M_{21} = 9$ | $M_{53} = M_{51} - M_{31} = 3$ | $M_{54} = M_{51} - M_{41} = 0$ | $M_{55} = 0$ | $M_{56} = M_{51} - M_{61} = -240$ |
| $M_{51} = M_{53} - M_{13} = 7$ | $M_{52} = M_{53} - M_{23} = 9$ | $M_{53} = M_{52} - M_{32} = 3$ | $M_{54} = M_{52} - M_{42} = 0$ | | $M_{56} = M_{52} - M_{62} = -240$ |
| $M_{51} = M_{54} - M_{14} = 7$ | $M_{52} = M_{54} - M_{24} = 9$ | $M_{53} = M_{54} - M_{34} = 3$ | $M_{54} = M_{53} - M_{43} = 0$ | | $M_{56} = M_{53} - M_{63} = 0$ |
| $M_{51} = M_{56} - M_{16} = 247$ | $M_{52} = M_{56} - M_{26} = 249$ | $M_{53} = M_{56} - M_{36} = 3$ | $M_{54} = M_{56} - M_{46} = 0$ | | $M_{56} = M_{54} - M_{64} = 0$ |
| $M_{61} = M_{62} - M_{12} = 247$ | $M_{62} = M_{61} - M_{21} = 249$ | $M_{63} = M_{61} - M_{31} = 243$ | $M_{64} = M_{61} - M_{41} = 240$ | $M_{65} = M_{61} - M_{51} = 240$ | $M_{66} = 0$ |
| $M_{61} = M_{63} - M_{13} = 7$ | $M_{62} = M_{83} - M_{23} = 9$ | $M_{63} = M_{62} - M_{32} = 243$ | $M_{64} = M_{62} - M_{42} = 240$ | $M_{65} = M_{62} - M_{52} = 240$ | |
| $M_{61} = M_{64} - M_{14} = 7$ | $M_{62} = M_{64} - M_{24} = 9$ | $M_{63} = M_{64} - M_{34} = 3$ | $M_{64} = M_{63} - M_{43} = 0$ | $M_{65} = M_{63} - M_{53} = 0$ | |
| $M_{61} = M_{65} - M_{15} = 7$ | $M_{62} = M_{65} - M_{25} = 9$ | $M_{63} = M_{65} - M_{35} = 3$ | $M_{64} = M_{65} - M_{45} = 0$ | $M_{65} = M_{64} - M_{54} = 0$ | |

Reviewing cell $M_{31}$ in Tables 11 and 12 shows all but one calculated result ($M_{31}=M_{36}-M_{16}=244$) to be in agreement (that $M_{31}=4$). Thus, the statistical mode in this sample is 4, with $M_{36}-M_{16}$ deviating greatly from the mode (1408). Two things can be learned from this cell. First, because of the near unanimity from the measured and calculated values, the direct cycle count offset between device $M_3$ and $M_1$ is almost certainly equal to 4 cycles. Second, the direct cycle count offsets of either cell $M_{36}$ and/or $M_{16}$ are incorrect in Table 11. The noisy data alignment algorithm 1400 notes these two facts for future reference in the final analysis. No more conclusions can be drawn from this cell alone.

Reviewing cell $M_{41}$ in Tables 11 and 12 again shows all but one calculated result ($M_{41}=M_{46}-M_{16}=247$) to be in agreement (that $M_{41}=7$). Thus, the statistical mode for this sample is 7 with $M_{46}-M_{16}$ deviating greatly from the mode (1408). Three things can be learned from this cell based on the discussion above in connection with cell $M_{31}$. First, because of the near unanimity from the measured and calculated values, the direct cycle count offset between device $D_4$ and $D_1$ is almost certainly equal to 7 cycles. Second, the direct cycle count offsets of either cell $M_{46}$ and/or $M_{16}$ are incorrect in Table 11. Third, based on the conclusions from cell $M_{31}$ and the conclusions in the previous sentence, cell $M_{16}$ is now beginning to look suspicious. Again, the noisy data alignment algorithm 1400 notes these facts for future reference in the final analysis. No more conclusions can be drawn from this cell alone.

Reviewing cell $M_{51}$ in Tables 11 and 12 again shows all but one calculated result ($M_{51}=M_{56}-M_{16}=247$) to be in agreement (that $M_{51}=7$). Thus, the statistical mode for this sample is 7 with $M_{56}-M_{16}$ deviating greatly from the mode (1408). Because of the near unanimity from the measured and calculated values, the direct cycle count offset between device $M_5$ and $M_1$ is almost certainly equal to 7 cycles. Again, the direct cycle count offsets of either cell $M_{56}$ and/or $M_{16}$ are incorrect in Table 11. Finally, based on the conclusions from cells $M_{31}$ and $M_{41}$ above, cell $M_{16}$ is now looking extremely suspicious. Once again, the noisy data alignment algorithm 1400 notes these facts for future reference in the final analysis.

Reviewing cell $M_{61}$ in Tables 11 and 12 shows two of the five relationships providing one answer ($M_{61}=M_{62}-M_{12}=247$) and remaining three providing another answer ($M_{61}=7$). Thus, the statistical mode for this sample is also 7, with $M_{62}-M_{12}$ deviating greatly from the mode (1408). Of the two relationships providing the answer $M_{61}=247$, one was the direct relationship ($M_6-M_1$) (see cell $M_{61}$ in Table 11). In the previous two paragraphs, suspicion was cast upon the validity of the direct relationship for $M_{61}$ (and thus $M_{16}$) because these offset values deviated from the statistical mode. It now becomes apparent that $M_{61} \neq 247$ ($M_{16} \neq -247$). This conclusion is further established after analyzing $M_{62}$, $M_{13}$, $M_{63}$, $M_{14}$, $M_{64}$, $M_{15}$, $M_{65}$, $M_{26}$, $M_{36}$, $M_{46}$, and $M_{56}$ in Tables 11 and 12. In all cases, the logical choice for the direct cycle count offsets of $M_{61}$ and $M_{16}$ in Table 11 is (7) and (−7) respectively.

It may not always be the case that the data from the indirect cycle count offset matrix will be useful as shown above. For example, it may not be possible to determine a statistical mode for a given set of indirect cycle count offsets because they may all be unique values (indicating many noisy device relationships). Alternately, there may be multiple statistical modes such as when multiple indirect cycle count offsets appear in equal numbers. When the data from the indirect cycle count offset matrix is unproductive (1410), the algorithm 1400 may return control to the data alignment algorithm 108 whereupon the monitoring devices are instructed to send another batch of data indicative of frequency variations for analysis by the data alignment algorithm.

TABLE 13

Direct Cycle Count Offset Matrix (Iteration 1)

| Device | $M_1$ | $M_2$ | $M_3$ | $M_4$ | $M_5$ | $M_6$ |
|---|---|---|---|---|---|---|
| $M_1$ | 0 | 2 | −4 | −7 | −7 | −7 |
| $M_2$ | −2 | 0 | −6 | −9 | −9 | −249 |
| $M_3$ | 4 | 6 | 0 | −3 | −3 | −3 |
| $M_4$ | 7 | 9 | 3 | 0 | 0 | 0 |
| $M_5$ | 7 | 9 | 3 | 0 | 0 | 0 |
| $M_6$ | 7 | 249 | 3 | 0 | 0 | 0 |

The noisy data alignment algorithm 1400 determines the data cell in the direct cycle count offset matrix (Table 11) to adjust and adjusts Table 11 by changing cell $M_{61}$ to (7) and cell $M_{16}$ to (−7) (1412), resulting in Table 13. Furthermore, changing any direct relationship value(s) necessitates revising the indirect relationship results as well (1414). The noisy data alignment algorithm 1400 builds Table 14 with the updated results of each indirect relationship to reflect the changes made to the direct relationship data (1414).

TABLE 14

Indirect Cycle Count Offset Matrix (Iteration 1)

| | | | | | |
|---|---|---|---|---|---|
| $M_{11}=0$ | $M_{12}=M_{13}-$ $M_{23}=2$ | $M_{13}=M_{12}-$ $M_{32}=-4$ | $M_{14}=M_{12}-$ $M_{42}=-7$ | $M_{15}=M_{12}-$ $M_{52}=-7$ | $M_{16}=M_{12}-$ $M_{62}=-247$ |
| | $M_{12}=M_{14}-$ $M_{24}=2$ | $M_{13}=M_{14}-$ $M_{34}=-4$ | $M_{14}=M_{13}-$ $M_{43}=-7$ | $M_{15}=M_{13}-$ $M_{53}=-7$ | $M_{16}=M_{13}-$ $M_{63}=-7$ |
| | $M_{12}=M_{15}-$ $M_{25}=2$ | $M_{13}=M_{15}-$ $M_{35}=-4$ | $M_{14}=M_{15}-$ $M_{45}=-7$ | $M_{15}=M_{14}-$ $M_{54}=-7$ | $M_{16}=M_{14}-$ $M_{64}=-7$ |
| | $M_{12}=M_{16}-$ $M_{26}=242$ | $M_{13}=M_{16}-$ $M_{36}=-4$ | $M_{14}=M_{16}-$ $M_{46}=-7$ | $M_{15}=M_{16}-$ $M_{56}=-7$ | $M_{16}=M_{15}-$ $M_{65}=-7$ |
| $M_{21}=M_{23}-$ $M_{13}=-2$ | $M_{22}=0$ | $M_{23}=M_{21}-$ $M_{31}=-6$ | $M_{24}=M_{21}-$ $M_{41}=-9$ | $M_{25}=M_{21}-$ $M_{51}=-9$ | $M_{26}=M_{21}-$ $M_{61}=-9$ |
| $M_{21}=M_{24}-$ $M_{14}=-2$ | | $M_{23}=M_{24}-$ $M_{34}=-6$ | $M_{24}=M_{23}-$ $M_{43}=-9$ | $M_{25}=M_{23}-$ $M_{53}=-9$ | $M_{26}=M_{23}-$ $M_{63}=-9$ |
| $M_{21}=M_{25}-$ $M_{15}=-2$ | | $M_{23}=M_{25}-$ $M_{35}=-6$ | $M_{24}=M_{25}-$ $M_{45}=-9$ | $M_{25}=M_{24}-$ $M_{54}=-9$ | $M_{26}=M_{24}-$ $M_{64}=-9$ |
| $M_{21}=M_{26}-$ $M_{16}=-242$ | | $M_{23}=M_{26}-$ $M_{36}=-246$ | $M_{24}=M_{26}-$ $M_{46}=-249$ | $M_{25}=M_{26}-$ $M_{56}=-249$ | $M_{28}=M_{25}-$ $M_{65}=-9$ |
| $M_{31}=M_{32}-$ $M_{12}=4$ | $M_{32}=M_{31}-$ $M_{21}=6$ | $M_{33}=0$ | $M_{34}=M_{31}-$ $M_{41}=-3$ | $M_{35}=M_{31}-$ $M_{51}=-3$ | $M_{36}=M_{31}-$ $M_{61}=-3$ |
| $M_{31}=M_{34}-$ $M_{14}=4$ | $M_{32}=M_{34}-$ $M_{24}=6$ | | $M_{34}=M_{32}-$ $M_{42}=-3$ | $M_{35}=M_{32}-$ $M_{52}=-3$ | $M_{36}=M_{32}-$ $M_{82}=-243$ |
| $M_{31}=M_{35}-$ | $M_{32}=M_{35}-$ | | $M_{34}=M_{35}-$ | $M_{35}=M_{34}-$ | $M_{36}=M_{34}-$ |

TABLE 14-continued

Indirect Cycle Count Offset Matrix (Iteration 1)

| | | | | | |
|---|---|---|---|---|---|
| $M_{15} = 4$ | $M_{25} = 6$ | | $M_{45} = -3$ | $M_{54} = -3$ | $M_{64} = -3$ |
| $M_{31} = M_{36} -$ | $M_{32} = M_{36} -$ | | $M_{34} = M_{36} -$ | $M_{35} = M_{36} -$ | $M_{36} = M_{35} -$ |
| $M_{16} = 4$ | $M_{26} = 246$ | | $M_{46} = -3$ | $M_{56} = -3$ | $M_{65} = -3$ |
| $M_{41} = M_{42} -$ | $M_{42} = M_{41} -$ | $M_{43} = M_{41} -$ | $M_{44} = 0$ | $M_{45} = M_{41} -$ | $M_{46} = M_{41} -$ |
| $M_{12} = 7$ | $M_{21} = 9$ | $M_{31} = 3$ | | $M_{51} = 0$ | $M_{61} = 0$ |
| $M_{41} = M_{43} -$ | $M_{42} = M_{43} -$ | $M_{43} = M_{42} -$ | | $M_{45} = M_{42} -$ | $M_{46} = M_{42} -$ |
| $M_{13} = 7$ | $M_{23} = 9$ | $M_{32} = 3$ | | $M_{52} = 0$ | $M_{62} = -240$ |
| $M_{41} = M_{45} -$ | $M_{42} = M_{45} -$ | $M_{43} = M_{45} -$ | | $M_{45} = M_{43} -$ | $M_{46} = M_{43} -$ |
| $M_{15} = 7$ | $M_{25} = 9$ | $M_{35} = 3$ | | $M_{53} = 0$ | $M_{63} = 0$ |
| $M_{41} = M_{46} -$ | $M_{42} = M_{46} -$ | $M_{43} = M_{46} -$ | | $M_{45} = M_{46} -$ | $M_{46} = M_{45} -$ |
| $M_{16} = 7$ | $M_{26} = 249$ | $M_{36} = 3$ | | $M_{56} = 0$ | $M_{65} = 0$ |
| $M_{51} = M_{52} -$ | $M_{52} = M_{51} -$ | $M_{53} = M_{51} -$ | $M_{54} = M_{51} -$ | $M_{55} = 0$ | $M_{56} = M_{51} -$ |
| $M_{12} = 7$ | $M_{21} = 9$ | $M_{31} = 3$ | $M_{41} = 0$ | | $M_{61} = 0$ |
| $M_{51} = M_{53} -$ | $M_{52} = M_{53} -$ | $M_{53} = M_{52} -$ | $M_{54} = M_{52} -$ | | $M_{56} = M_{52} -$ |
| $M_{13} = 7$ | $M_{23} = 9$ | $M_{32} = 3$ | $M_{42} = 0$ | | $M_{62} = -240$ |
| $M_{51} = M_{54} -$ | $M_{52} = M_{54} -$ | $M_{53} = M_{54} -$ | $M_{54} = M_{53} -$ | | $M_{56} = M_{53} -$ |
| $M_{14} = 7$ | $M_{24} = 9$ | $M_{34} = 3$ | $M_{43} = 0$ | | $M_{63} = 0$ |
| $M_{51} = M_{56} -$ | $M_{52} = M_{56} -$ | $M_{53} = M_{56} -$ | $M_{54} = M_{56} -$ | | $M_{56} = M_{54} -$ |
| $M_{16} = 7$ | $M_{26} = 249$ | $M_{36} = 3$ | $M_{46} = 0$ | | $M_{64} = 0$ |
| $M_{61} = M_{62} -$ | $M_{62} = M_{61} -$ | $M_{63} = M_{61} -$ | $M_{64} = M_{61} -$ | $M_{65} = M_{61} -$ | $M_{66} = 0$ |
| $M_{12} = 247$ | $M_{21} = 9$ | $M_{31} = 3$ | $M_{41} = 0$ | $M_{51} = 0$ | |
| $M_{61} = M_{63} -$ | $M_{62} = M_{63} -$ | $M_{63} = M_{62} -$ | $M_{64} = M_{62} -$ | $M_{65} = M_{62} -$ | |
| $M_{13} = 7$ | $M_{23} = 9$ | $M_{32} = 243$ | $M_{42} = 240$ | $M_{52} = 240$ | |
| $M_{61} = M_{64} -$ | $M_{62} = M_{64} -$ | $M_{63} = M_{64} -$ | $M_{64} = M_{63} -$ | $M_{65} = M_{63} -$ | |
| $M_{14} = 7$ | $M_{24} = 9$ | $M_{34} = 3$ | $M_{43} = 0$ | $M_{53} = 0$ | |
| $M_{61} = M_{65} -$ | $M_{62} = M_{65} -$ | $M_{63} = M_{65} -$ | $M_{64} = M_{65} -$ | $M_{65} = M_{64} -$ | |
| $M_{15} = 7$ | $M_{25} = 9$ | $M_{35} = 3$ | $M_{45} = 0$ | $M_{54} = 0$ | |

Reviewing cell $M_{21}$ in Tables 13 and 14 shows all but one calculated result ($M_{21}=M_{26}-M_{16}=-242$) to be in agreement (that $M_{21}=-2$). This is curious because cell $M_{21}$ from Table 12 showed agreement among all relationships (both direct and indirect). However, because cells $M_{61}$ and $M_{16}$ were later shown to be inaccurate, this can only mean that cells $M_{26}$ and $M_{62}$ are incorrect as well. Further analyzing the relationships in cells $M_{61}$, $M_{12}$, $M_{32}$, $M_{42}$, $M_{52}$, $M_{23}$, $M_{63}$, $M_{24}$, $M_{64}$, $M_{25}$, $M_{65}$, $M_{16}$, $M_{36}$, $M_{46}$, and $M_{56}$ of Table 14 and cells $M_{62}$ and $M_{26}$ of Table 13 validate the conclusion that the direct cycle count offsets in cells $M_{26}$ and $M_{62}$ of Table 13 are indeed incorrect. Cell $M_{62}$ of Table 14 unanimously concludes that cell $M_{62}$ of Table 13 should equal (9). Cell $M_{26}$ of Table 14 also unanimously concludes that cell $M_{26}$ of Table 13 should equal (-9). A significant advantage of this noisy data alignment algorithm 1400 is that there can be only one solution; there will be no ambiguity as to the correct offset value to the modified in the direct cycle count offset matrix.

TABLE 15

Direct Cycle Count Offset Matrix (Iteration 2)

| Device | $M_1$ | $M_2$ | $M_3$ | $M_4$ | $M_5$ | $M_6$ |
|---|---|---|---|---|---|---|
| $M_1$ | 0 | 2 | -4 | -7 | -7 | -7 |
| $M_2$ | -2 | 0 | -6 | -9 | -9 | -9 |
| $M_3$ | 4 | 6 | 0 | -3 | -3 | -3 |
| $M_4$ | 7 | 9 | 3 | 0 | 0 | 0 |
| $M_5$ | 7 | 9 | 3 | 0 | 0 | 0 |
| $M_6$ | 7 | 9 | 3 | 0 | 0 | 0 |

The noisy data alignment algorithm adjusts Table 13 by changing cell $M_{62}$ to (9) and cell $M_{26}$ to (-9) (1412) to produce see Table 15. Again, changing any direct relationship value(s) necessitates revising the indirect relationship results as well (1414). The noisy data alignment algorithm 1440 builds Table 16 with the updated results of each indirect relationship to reflect the changes made to the direct relationship data (1414). Analysis of both Tables 15 and 16 reveals that all direct and indirect relationships are in consensus and the results given in these tables are the solution (1416).

TABLE 16

Indirect Cycle Count Offset Matrix (Iteration 2)

| | | | | | | |
|---|---|---|---|---|---|---|
| $M_{11} = 0$ | | $M_{12} = M_{13} -$ | $M_{13} = M_{12} -$ | $M_{14} = M_{12} -$ | $M_{15} = M_{12} -$ | $M_{16} = M_{12} -$ |
| | | $M_{23} = 2$ | $M_{32} = -4$ | $M_{42} = -7$ | $M_{52} = -7$ | $M_{62} = -7$ |
| | | $M_{12} = M_{14} -$ | $M_{13} = M_{14} -$ | $M_{14} = M_{13} -$ | $M_{15} = M_{13} -$ | $M_{16} = M_{13} -$ |
| | | $M_{24} = 2$ | $M_{34} = -4$ | $M_{43} = -7$ | $M_{53} = -7$ | $M_{63} = -7$ |
| | | $M_{12} = M_{15} -$ | $M_{13} = M_{15} -$ | $M_{14} = M_{15} -$ | $M_{15} = M_{14} -$ | $M_{16} = M_{14} -$ |
| | | $M_{25} = 2$ | $M_{35} = -4$ | $M_{45} = -7$ | $M_{54} = -7$ | $M_{64} = -7$ |
| | | $M_{12} = M_{16} -$ | $M_{13} = M_{16} -$ | $M_{14} = M_{16} -$ | $M_{15} = M_{16} -$ | $M_{16} = M_{15} -$ |
| | | $M_{26} = 2$ | $M_{36} = -4$ | $M_{46} = -7$ | $M_{56} = -7$ | $M_{65} = -7$ |
| $M_{21} = M_{23} -$ | $M_{22} = 0$ | | $M_{23} = M_{21} -$ | $M_{24} = M_{21} -$ | $M_{25} = M_{21} -$ | $M_{26} = M_{21} -$ |
| $M_{13} = -2$ | | | $M_{31} = -6$ | $M_{41} = -9$ | $M_{51} = -9$ | $M_{61} = -9$ |
| $M_{21} = M_{24} -$ | | | $M_{23} = M_{24} -$ | $M_{24} = M_{23} -$ | $M_{25} = M_{23} -$ | $M_{26} = M_{23} -$ |

TABLE 16-continued

Indirect Cycle Count Offset Matrix (Iteration 2)

| | | | | | |
|---|---|---|---|---|---|
| $M_{14} = -2$ | | $M_{34} = -6$ | $M_{43} = -9$ | $M_{53} = -9$ | $M_{63} = -9$ |
| $M_{21} = M_{25} -$ | | $M_{23} = M_{25} -$ | $M_{24} = M_{25} -$ | $M_{25} = M_{24} -$ | $M_{26} = M_{24} -$ |
| $M_{15} = -2$ | | $M_{35} = -6$ | $M_{45} = -9$ | $M_{54} = -9$ | $M_{64} = -9$ |
| $M_{21} = M_{26} -$ | | $M_{23} = M_{26} -$ | $M_{24} = M_{26} -$ | $M_{25} = M_{26} -$ | $M_{26} = M_{25} -$ |
| $M_{16} = -2$ | | $M_{36} = -6$ | $M_{46} = -9$ | $M_{56} = -9$ | $M_{65} = -9$ |
| $M_{31} = M_{32} -$ | $M_{32} = M_{31} -$ | $M_{33} = 0$ | $M_{34} = M_{31} -$ | $M_{35} = M_{31} -$ | $M_{36} = M_{31} -$ |
| $M_{12} = 4$ | $M_{21} = 6$ | | $M_{41} = -3$ | $M_{51} = -3$ | $M_{61} = -3$ |
| $M_{31} = M_{34} -$ | $M_{32} = M_{34} -$ | | $M_{34} = M_{32} -$ | $M_{35} = M_{32} -$ | $M_{36} = M_{32} -$ |
| $M_{14} = 4$ | $M_{24} = 6$ | | $M_{42} = -3$ | $M_{52} = -3$ | $M_{62} = -3$ |
| $M_{31} = M_{35} -$ | $M_{32} = M_{35} -$ | | $M_{34} = M_{35} -$ | $M_{35} = M_{34} -$ | $M_{36} = M_{34} -$ |
| $M_{15} = 4$ | $M_{25} = 6$ | | $M_{45} = -3$ | $M_{54} = -3$ | $M_{64} = -3$ |
| $M_{31} = M_{36} -$ | $M_{32} = M_{36} -$ | | $M_{34} = M_{36} -$ | $M_{35} = M_{36} -$ | $M_{36} = M_{35} -$ |
| $M_{16} = 4$ | $M_{26} = 6$ | | $M_{46} = -3$ | $M_{56} = -3$ | $M_{65} = -3$ |
| $M_{41} = M_{42} -$ | $M_{42} = M_{41} -$ | $M_{43} = M_{41} -$ | $M_{44} = 0$ | $M_{45} = M_{41} -$ | $M_{46} = M_{41} -$ |
| $M_{12} = 7$ | $M_{21} = 9$ | $M_{31} = 3$ | | $M_{51} = 0$ | $M_{61} = 0$ |
| $M_{41} = M_{43} -$ | $M_{42} = M_{43} -$ | $M_{43} = M_{42} -$ | | $M_{45} = M_{42} -$ | $M_{46} = M_{42} -$ |
| $M_{13} = 7$ | $M_{23} = 9$ | $M_{32} = 3$ | | $M_{52} = 0$ | $M_{62} = 0$ |
| $M_{41} = M_{45} -$ | $M_{42} = M_{45} -$ | $M_{43} = M_{45} -$ | | $M_{45} = M_{43} -$ | $M_{46} = M_{43} -$ |
| $M_{15} = 7$ | $M_{25} = 9$ | $M_{35} = 3$ | | $M_{53} = 0$ | $M_{63} = 0$ |
| $M_{41} = M_{46} -$ | $M_{42} = M_{46} -$ | $M_{43} = M_{46} -$ | | $M_{45} = M_{46} -$ | $M_{46} = M_{45} -$ |
| $M_{16} = 7$ | $M_{26} = 9$ | $M_{36} = 3$ | | $M_{56} = 0$ | $M_{65} = 0$ |
| $M_{51} = M_{52} -$ | $M_{52} = M_{51} -$ | $M_{53} = M_{51} -$ | $M_{54} = M_{51} -$ | $M_{55} = 0$ | $M_{56} = M_{51} -$ |
| $M_{12} = 7$ | $M_{21} = 9$ | $M_{31} = 3$ | $M_{41} = 0$ | | $M_{61} = 0$ |
| $M_{51} = M_{53} -$ | $M_{52} = M_{53} -$ | $M_{53} = M_{52} -$ | $M_{54} = M_{52} -$ | | $M_{56} = M_{52} -$ |
| $M_{13} = 7$ | $M_{23} = 9$ | $M_{32} = 3$ | $M_{42} = 0$ | | $M_{62} = 0$ |
| $M_{51} = M_{54} -$ | $M_{52} = M_{54} -$ | $M_{53} = M_{54} -$ | $M_{54} = M_{53} -$ | | $M_{56} = M_{53} -$ |
| $M_{14} = 7$ | $M_{24} = 9$ | $M_{34} = 3$ | $M_{43} = 0$ | | $M_{63} = 0$ |
| $M_{51} = M_{56} -$ | $M_{52} = M_{56} -$ | $M_{53} = M_{56} -$ | $M_{54} = M_{56} -$ | | $M_{56} = M_{54} -$ |
| $M_{16} = 7$ | $M_{26} = 9$ | $M_{36} = 3$ | $M_{46} = 0$ | | $M_{64} = 0$ |
| $M_{61} = M_{62} -$ | $M_{62} = M_{61} -$ | $M_{63} = M_{61} -$ | $M_{64} = M_{61} -$ | $M_{65} = M_{61} -$ | $M_{66} = 0$ |
| $M_{12} = 7$ | $M_{21} = 9$ | $M_{31} = 3$ | $M_{41} = 0$ | $M_{51} = 0$ | |
| $M_{61} = M_{63} -$ | $M_{62} = M_{63} -$ | $M_{63} = M_{62} -$ | $M_{64} = M_{62} -$ | $M_{65} = M_{62} -$ | |
| $M_{13} = 7$ | $M_{23} = 9$ | $M_{32} = 3$ | $M_{42} = 0$ | $M_{52} = 0$ | |
| $M_{61} = M_{64} -$ | $M_{62} = M_{64} -$ | $M_{63} = M_{64} -$ | $M_{64} = M_{63} -$ | $M_{65} = M_{63} -$ | |
| $M_{14} = 7$ | $M_{24} = 9$ | $M_{34} = 3$ | $M_{43} = 0$ | $M_{53} = 0$ | |
| $M_{61} = M_{65} -$ | $M_{62} = M_{65} -$ | $M_{63} = M_{65} -$ | $M_{64} = M_{65} -$ | $M_{65} = M_{64} -$ | |
| $M_{15} = 7$ | $M_{25} = 9$ | $M_{35} = 3$ | $M_{45} = 0$ | $M_{54} = 0$ | |

Examination of Results

There were a total of 15 unique relationships as shown in Table 10. It was necessary to adjust two of these direct relationships to determine the actual solution and bring accord to intertwined cycle count offset relationships between all devices. Device $D_6$ apparently had a noisy relationship with both devices $D_1$ and $D_2$ as revealed in the analysis above. Fortunately, device $D_6$ did not have a noisy relationship with all devices, and the noisy data alignment algorithm used that fact to its advantage.

Once the solution in Table 15 has been determined by the noisy data alignment algorithm 1400, the cycle counts in all of the monitoring devices may be either adjusted to the same cycle count based upon the solutions reported in Table 15 (1418) or the cycle count offsets for each device pair may be stored and tracked by the data alignment system 104 to be used accordingly. For example, when a steady-state phenomenon or non steady-state phenomenon (also referred to generally as an event) (as those terms are defined in the IEEE and IEC standards) occurs on the power system being monitored, the data alignment system 104 accesses the direct cycle count offset matrix, as modified by the noisy data alignment algorithm 1400, to determine whether the monitoring devices perceived the same event or steady-state phenomenon or different ones. To do so, the cycle count offsets of each capable device reporting the event of steady-state phenomenon are accounted for by referencing the direct cycle count offset table, which may include modified offset values as determined by the noisy data alignment algorithm 1400. For example, without alignment, $D_6$ and $D_1$ appear to report different events occurring at different cycles that are 247 counts apart. But after adjustment by the noisy data alignment algorithm 1400, the data alignment system 104 learns that these devices are actually only 7 cycle counts apart and further that they are both monitoring the same event or phenomenon. This alignment of data is an invaluable tool for further analysis, reporting, and alarming based upon the signal data received from the monitoring devices.

The software application 110 may communicate instructions to each of the monitoring devices whose cycle counters need to be adjusted, signals indicative of a number of cycle counts by which the monitoring device must adjust its cycle counter. Alternately, the software application 110 may instruct the monitoring devices to reset their cycle counters in an order consistent with Table 15. For example monitoring device $D_2$ will be instructed to adjust its cycle counter by 2 counts relative to monitoring device $D_1$.

As is shown in the example above, signal data representing frequency variations from the monitoring devices was collected only one time from which the solution (Table 15) was achieved without superfluous influence of statistical probabilities. The solution can be confirmed to be empirically correct with the use of a GPS time system. The data alignment algorithm 180 is invoked sparingly, thus reducing the bandwidth on the monitoring devices, the software 110, and communications network. Because data does not have to be repeatedly collected from the devices, the overall speed and efficiency of the automated data alignment process is substantially increased. Finally and most importantly, a unique and compelling technique is offered for noisy device pairs providing the data alignment algorithm with enhanced robustness for the most difficult systems.

It should be noted that there may be monitoring systems that exhibit an extensive number of noisy device pair relationships, or there may specific devices that demonstrate noisy relationships with all other devices. This noisy data alignment solution has the added benefit of being able to measure the validity and usefulness of the data sample taken by the data alignment algorithm 180. A single pass of the sample data through the noisy data alignment algorithm 1400 is adequate to determine whether the data sample will be useful based on the level of accord between the devices. In the instances where the data sample is not useful, it may be necessary to reinitialize and run the data alignment algorithm 180 to obtain a useful data sample that will iterate to the solution.

The unexpected interconnection of relationships between the cycle counts of monitoring devices on a power monitoring system as described herein provided a way of solving a real-world dilemma. The noisy data alignment solution represents a vital component in reducing the overall cost of power monitoring systems while improving the data analyses and solutions for the end-user.

Optional Verification of Results

As an optional verification of alignment based on the cross-correlation of frequency between device pairs, it may be helpful to evaluate alternative solutions given by the data alignment algorithm 180. In the majority of cases, the cycle count offset corresponding to the highest correlation is the correct solution. However, as shown above, it is possible for the highest correlation coefficient to be incorrect (as is the case for any noisy device pair).

Figure 13:
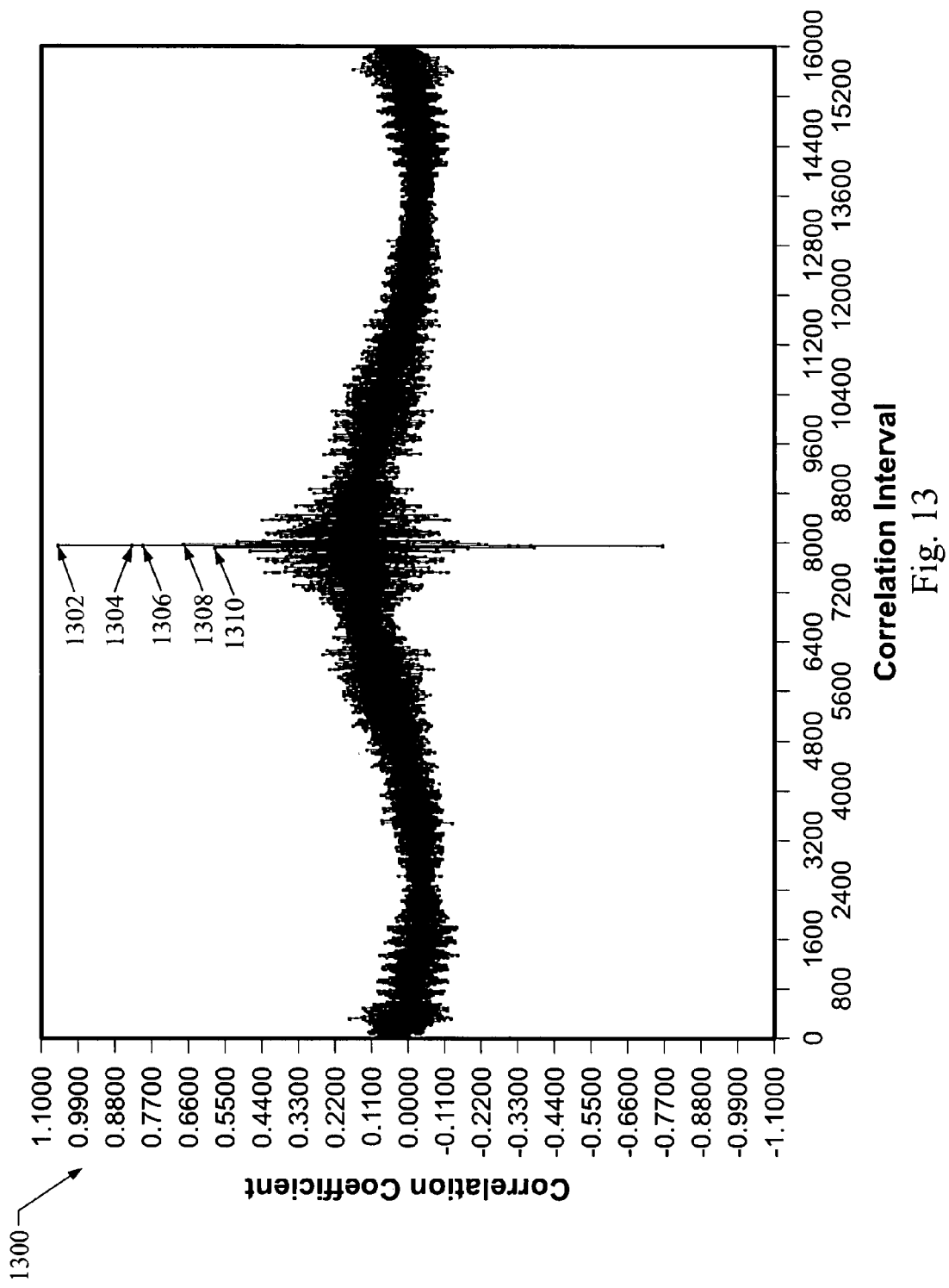
FIG. 13 is a cross-correlation chart for an exemplary device pair showing a number of correlation coefficients.

Data has shown that even when the incorrect solution is given by the data alignment algorithm, the correct solution is still determined to be a leading candidate among the most probable correlations. For example, FIG. 13 illustrates exemplary cross-correlation data from an exemplary device pair. FIG. 13 notes the top five potential solutions given by the data alignment algorithm corresponding to the top five highest correlation coefficients 1302, 1304, 1306, 1308, 1310 of that device pair. Even if the highest cross-correlation coefficient 1302 is incorrect, data has shown the correct solution may still be one of the highest cross-correlation coefficients (such as one of these five).

Figure 14B:
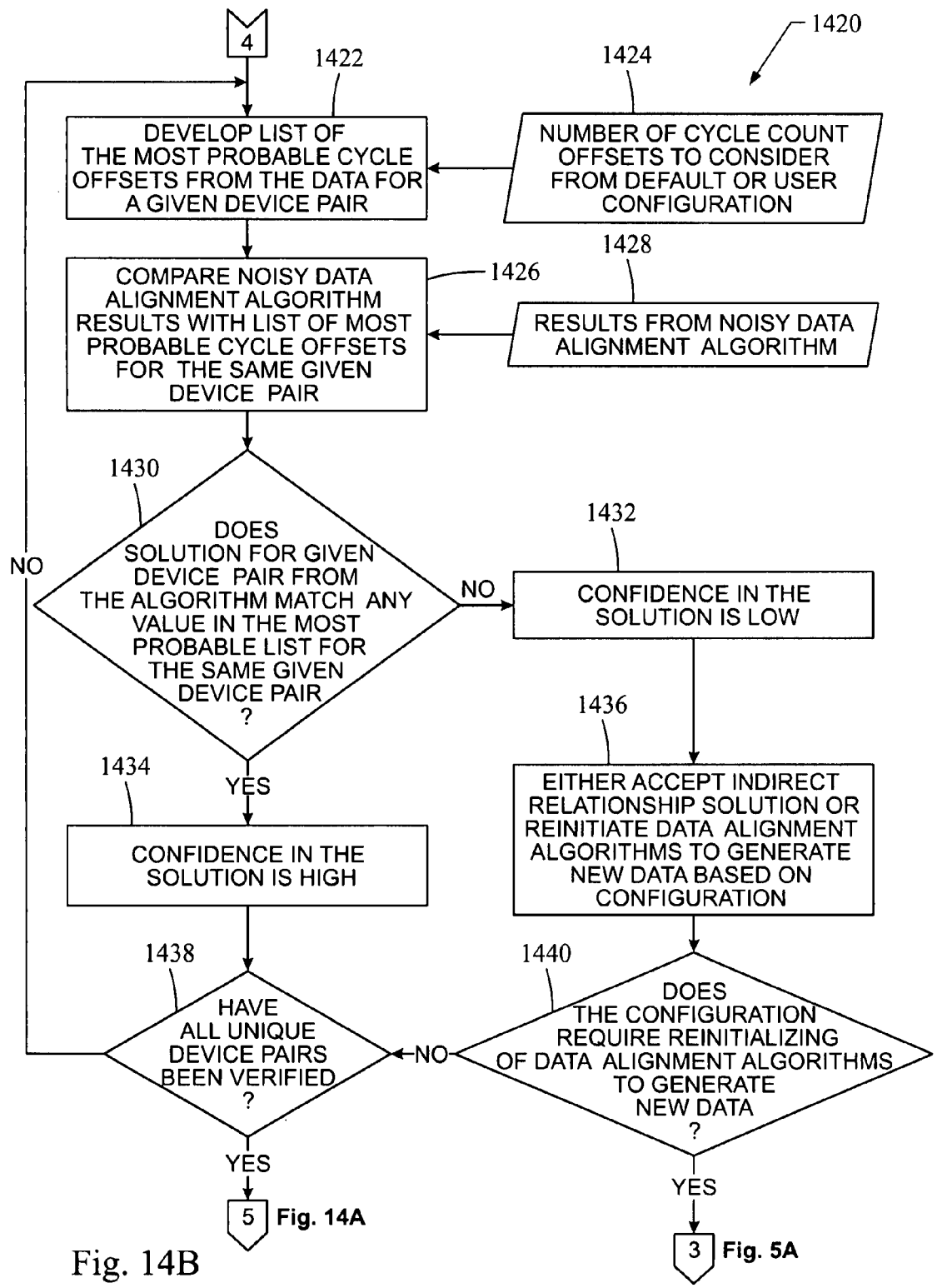
FIG. 14B is a flow chart diagram of an optional verification algorithm to the noisy data alignment algorithm shown in FIG. 14A.

The optional verification algorithm 1420 enables a comparison of the results given by the noisy data alignment algorithm 1400 with multiple potential solutions given by the cross-correlation data developed in the data alignment algorithm 180. FIG. 14B illustrates the optional verification algorithm 1420.

The verification algorithm 1420 develops a list of the most probable cycle count offsets for a given device pair to be verified (1422). Each correlation coefficient produced during the cross-correlation is associated with a cycle count for each device. Responsive to a default or user configuration, the number of cycle count offsets 1424 to consider in the verification algorithm 1420 is accessed by the algorithm 1420. For example, one configuration may test the top five correlation coefficients to determine whether the adjusted cycle count offset corresponds to one of the top five correlation coefficients. The results from the noisy data alignment algorithm 1400 (such as Table 15) 1428 are accessed by the algorithm 1420. The algorithm 1420 compares the offset values determined by the noisy data alignment algorithm 1400 (e.g., the values in the direct cycle count offset matrix Table 15) with the list of the most probable cycle offsets (also referred to as verification cycle count offsets) for the same given device pair (1426). For example, for the offset $M_{61}=7$, the verification algorithm 1420 compares that offset with the offset calculated from the cycle counts corresponding to the five highest correlation coefficients 1302, 1304, 1306, 1308, 1310. If the cycle count offset $M_{61}$ matches any cycle count offsets calculated based upon any of the five highest correlation coefficients 1302, 1304, 1306, 1308, 1310 (1430), then the algorithm 1420 reports a high degree of confidence in the solution (1434). When the confidence in the adjusted indirect cycle count offset is high (1434), the algorithm 1420 determines whether all unique device pairs to be verified have been verified (1438) or at least those device pairs whose cycle count offsets were adjusted by the noisy data alignment algorithm 1400, and if not, repeats the verification for the next device pair until there are no further device pairs to be verified. Otherwise, when the adjusted cycle count offset does not correspond to any of the cycle count offsets calculated from the list of probable cycle count offsets, the algorithm 1420 assigns the confidence in the solution as low (1432), and, depending upon a default or user configuration, the indirect relationship determined by the algorithm 1420 may be accepted or the data alignment algorithm 180 may be reinitiated to generate new data (1436). If the default or user configuration requires reinitializing the data alignment algorithm 180 to generate a new direct cycle count offset matrix (1440), control of the algorithm 1420 is passed back to the data alignment algorithm 180 (FIG. 5A).

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of automatically aligning data measured by a number, n, of monitoring devices in a power monitoring system, comprising:

receiving from each of said monitoring devices respective signal data representing at least frequency variations measured by respective ones of said monitoring devices, said monitoring devices including a reference monitoring device and a second monitoring device;

correlating said signal data from said reference monitoring device with said signal data from said second monitoring device to determine a reference cycle count, $M_i$, associated with said reference monitoring device corresponding to a maximum correlation coefficient and a second cycle count, $M_j$, associated with said second monitoring device corresponding to said maximum correlation coefficient;

automatically calculating a direct cycle count offset, $M_{ij}$, as a function of a difference between said reference cycle count, $M_i$, and said second cycle count, $M_j$, and storing said direct cycle count offset in a direct cycle count offset matrix; and automatically calculating an indirect cycle count offset as a function of at least $M_k$, where $k \neq i \neq j$ and $1 \leq k \leq n$, said $M_k$ being a cycle count associated with a monitoring device of said n monitoring devices other than said reference monitoring device and other than said second monitoring device.

2. The method of claim 1, wherein said automatically calculating said indirect cycle count offset is carried out with respect to at least two other of said n monitoring devices except said reference monitoring device and except second monitoring device to produce at least two indirect cycle count offsets including said indirect cycle count offset.

3. The method of claim 2, further comprising determining which of said at least 2 indirect cycle count offsets differs from said direct cycle count offset.

4. The method of claim 2, further comprising:
determining a statistical mode from a set comprised of said at least 2 indirect cycle count offsets to produce a mode value; and
determining whether the mode value differs from said direct cycle count offset.

5. The method of claim 1, further comprising, responsive to said direct cycle count offset differing from said indirect cycle count offset, producing a modified direct cycle count offset equal to said indirect cycle count offset.

6. The method of claim 5, further comprising storing an indication that said signal data associated with said reference monitoring device and said signal data associated with said second monitoring device are aligned.

7. The method of claim 5, further comprising communicating said modified direct cycle count offset to said reference monitoring device or to said second monitoring device to cause said reference monitoring device or said second monitoring device to adjust a cycle counter in said reference monitoring device or in said second monitoring device by a value corresponding to said modified direct cycle count offset.

8. The method of claim 1, wherein said indirect cycle count offset is a function of at least $M_{ik}-M_{jk}$.

9. The method of claim 1, wherein said indirect cycle count offset is a function of at least $M_m$, where $m \neq i \neq j$ and $1 \leq m \leq n$, said $M_m$ being a cycle count associated with a monitoring device of said n monitoring devices other than said reference monitoring device and other than said second monitoring device and other than said monitoring device associated with $M_k$.

10. The method of claim 1, further comprising
determining a first verification cycle count, $M_i'$, associated with said reference monitoring device corresponding to a first correlation coefficient that is less than said maximum correlation coefficient;
determining a second verification cycle count, $M_j'$, associated with said second monitoring device corresponding to said first correlation coefficient;
automatically calculating a verification cycle count offset, $M_{ij}'$, based upon the difference between said first verification cycle count, $M_i'$, and said second verification cycle count, $M_j'$, and storing said verification cycle count offset; and
responsive to said verification cycle count offset equaling said indirect cycle count offset, storing an indication of a level of confidence in said indirect cycle count offset based upon said first correlation coefficient.

11. The method of claim 10, wherein said first correlation coefficient is above a predetermined threshold below said maximum correlation coefficient.

12. The method of claim 1, wherein said direct cycle count offset matrix is an (n×n) skew-symmetric matrix.

13. The method of claim 1, wherein said frequency variations represented by said first signal data are variations in fundamental frequency or variations in harmonic frequency, wherein said variations are associated with a voltage or a current.

14. The method of claim 1, wherein each of said n monitoring devices includes a cycle counter, the method further comprising communicating simultaneously a signal to said n monitoring devices to reset their respective cycle counters.

15. A method of automatically aligning data measured by a number, n, of monitoring devices in a power, monitoring system, comprising:
receiving from each of said monitoring devices respective signal data, $S_n$, representing at least frequency variations measured by respective ones of said monitoring devices;
for each of a plurality of device pairs within a set comprising said n number of monitoring devices, wherein each device pair is termed $D_{ij}$, where $i \neq j$, where $1 \leq i \leq n$, and where $1 \leq j \leq n$, correlating said signal data $S_i$ with said signal data $S_j$ for each of said device pairs, $D_{ij}$, to determine respective cycle counts, $M_i$ and $M_j$, associated with $D_i$ and $D_j$, respectively, said cycle counts corresponding to a maximum correlation coefficient produced by said correlating;
for each of said device pairs, $D_{ij}$, automatically calculating a direct cycle count offset, $M_{ij}=M_i-M_j$, and storing said direct cycle count offset in a direct cycle count offset matrix;
for each of said direct cycle count offsets, $M_{ij}$, automatically calculating a plurality of indirect cycle count offsets as a function of at least $M_k$, said $M_k$ being a cycle count associated with a monitoring device of said n monitoring devices other than said reference monitoring device and other than said second monitoring device, where $1 \leq k \leq n$, and $k \neq i \neq j$;
storing said plurality of indirect cycle count offsets for each $M_{ij}$ in an indirect cycle count offset matrix;
for each of said direct cycle count offsets, $M_{ij}$, in said direct cycle count offset matrix, determining whether $M_{ij}$ is not equal to at least one of said plurality of indirect cycle count offsets, and, responsive thereto, storing an indication that $M_{ij}$ in said direct cycle count offset matrix is equal to a value corresponding to said at least one of said indirect cycle count offsets.

16. The method of claim 15, further comprising communicating an indication of said value to $D_i$ or $D_j$ to cause $D_i$ or $D_j$ to adjust a cycle counter by an amount corresponding to said value.

17. The method of claim 15, further comprising communicating a signal to each of said n monitoring devices to reset respective cycle counters in each of said n monitoring devices at substantially the same time.

18. The method of claim 15, further comprising:
determining a statistical mode from a set comprised of said indirect cycle count offsets for $M_{ij}$ to produce a mode value; and
determining whether said mode value equals $M_{ij}$ in said direct cycle count offset matrix.

19. The method of claim 15, wherein said correlating produces a plurality of correlation coefficients including said maximum correlation coefficient, the method further comprising:
for said devices $D_i$ and $D_j$ corresponding to said modified $M_{ij}$, determining a plurality of probable cycle count offsets associated with a predetermined number of said plurality of correlation coefficients that are less than said maximum correlation coefficient; and
responsive to one of said plurality of said probable cycle count offsets equaling said modified $M_{ij}$, storing an indication of a level of confidence in said modified $M_{ij}$ commensurate with how proximal a correlation coefficient of said plurality of said correlation coefficients corresponding to said one of said plurality of said probable cycle count offsets is to said maximum correlation coefficient.

20. The method of claim 15, further comprising:
receiving from at least one of said monitoring devices second signal data representing at least frequency variations measured by said at least one of said monitoring devices; and
adjusting a cycle count associated with said at least one of said monitoring devices by said value corresponding to said at least one of said indirect cycle count offsets.

21. A method of automatically aligning data monitored by a number, n, of monitoring devices, D, associated with a power monitoring system, comprising:
automatically correlating respective signal data from a pair of said monitoring devices, $D_i$ and $D_j$, to determine a maximum correlation coefficient associated with respective cycle counts for said pair of monitoring devices, $D_{ij}$, said respective signal data representing frequency variations monitored by said $D_i$ and said $D_j$, respectively;
determining a first cycle count offset, $M_{ij}$, by calculating a difference between said respective cycle counts;
determining a second cycle count offset from a function that includes at least a cycle count associated with a monitoring device of said monitoring devices other than $D_i$ or $D_j$; and
storing an indication that said first cycle count offset is equal to a value corresponding to said second cycle count offset.

22. The method of claim 21, further comprising communicating an instruction to said $D_i$ or to said $D_j$ to adjust a cycle counter, which stores said respective cycle counts, by an amount corresponding to said value.

23. The method of claim 21, wherein said automatically correlating includes determining whether said second cycle count offset equals a cycle count offset associated with a correlation coefficient that is less than said maximum correlation coefficient.

* * * * *